| (12) | United States Patent | (10) Patent No.: | US 11,079,887 B2 |
|---|---|---|---|
| | Nakayama | (45) Date of Patent: | Aug. 3, 2021 |

(54) CONDUCTIVE MEMBER FOR TOUCH PANEL AND TOUCH PANEL

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/715,138

(22) Filed: Dec. 16, 2019

(65) Prior Publication Data

US 2020/0117301 A1 Apr. 16, 2020

Related U.S. Application Data

(63) Continuation of application No. PCT/JP2018/026257, filed on Jul. 12, 2018.

(30) Foreign Application Priority Data

Jul. 27, 2017 (JP) .............................. JP2017-145155

(51) Int. Cl.
  *G06F 3/041* (2006.01)
  *G06F 3/044* (2006.01)
  *G06F 3/047* (2006.01)

(52) U.S. Cl.
  CPC ............ *G06F 3/0445* (2019.05); *G06F 3/047* (2013.01); *G06F 3/0446* (2019.05); *G06F 3/0448* (2019.05); *G06F 2203/04112* (2013.01)

(58) Field of Classification Search
  CPC .......... G06F 3/041; G06F 3/044; G06F 3/045; G09G 3/00; G09G 3/36; G09G 5/00
  See application file for complete search history.

(56) References Cited

U.S. PATENT DOCUMENTS

2011/0102361 A1  5/2011  Philipp
2014/0216783 A1  8/2014  Trauernicht et al.
              (Continued)

FOREIGN PATENT DOCUMENTS

JP      11-110115 A    4/1999
JP      2012-163951 A  8/2012
              (Continued)

OTHER PUBLICATIONS

International Search Report Issued in PCT/JP2018/026257 dated Oct. 2, 2018.

(Continued)

*Primary Examiner* — Pegeman Karimi
(74) *Attorney, Agent, or Firm* — Edwards Neils LLC; Jean C. Edwards, Esq.

(57) ABSTRACT

A conductive member for a touch panel has a transparent insulating substrate and a first conductive layer which is formed on the transparent insulating substrate, in which the first conductive layer has a first mesh pattern which is composed of a plurality of first mesh cells having a closed shape and formed of thin metal wires, the number of directional components in which vertices of the plurality of first mesh cells are arranged in a straight line is 1 or less, and the number of directional components in which vertices of the plurality of first mesh cells are arranged in a straight line represents the number of sets of parallel line segments, each of the line segments passing through four or more vertices of four or more of the plurality of first mesh cells which are continuously arranged in a straight line.

9 Claims, 13 Drawing Sheets

(56) References Cited

U.S. PATENT DOCUMENTS

| | | | |
|---|---|---|---|
| 2014/0292713 A1 | 10/2014 | Koito et al. | |
| 2014/0293160 A1* | 10/2014 | Tang | G02F 1/133514 349/12 |
| 2016/0170541 A1* | 6/2016 | Iwami | G06F 3/0445 345/174 |
| 2016/0195983 A1* | 7/2016 | Miyake | G06F 3/0412 345/174 |
| 2017/0168608 A1* | 6/2017 | Kim | G06F 3/0446 |
| 2018/0107304 A1 | 4/2018 | Hara et al. | |
| 2018/0232080 A1 | 8/2018 | Iwami | |
| 2018/0307350 A1* | 10/2018 | Nukui | G06F 3/044 |
| 2018/0350883 A1* | 12/2018 | Lee | H01L 51/5275 |

FOREIGN PATENT DOCUMENTS

| | | |
|---|---|---|
| JP | 2014-191657 A | 10/2014 |
| JP | 2015-143978 A | 8/2015 |
| JP | 2017-027466 A | 2/2017 |
| JP | 2017-076336 A | 4/2017 |
| JP | 2017-097439 A | 6/2017 |
| WO | 2017/018051 A1 | 2/2017 |

OTHER PUBLICATIONS

Written Opinion Issued in PCT/JP2018/026257 dated Oct. 2, 2018.
International Preliminary Report on Patentability Issued in PCT/JP2018/026257 dated Oct. 9, 2019.
Office Action, issued by the Japanese Patent Office dated Mar. 30, 2021, in connection with Japanese Patent Application No. 2019-532501.

* cited by examiner

CONDUCTIVE MEMBER FOR TOUCH PANEL AND TOUCH PANEL

CROSS-REFERENCE TO RELATED APPLICATIONS

This application is a Continuation of PCT International Application No. PCT/JP2018/026257, filed on Jul. 12, 2018, which was published under PCT Article 21(2) in Japanese, and which claims priority under 35 U.S.C. § 119(a) to Japanese Patent Application No. 2017-145155, filed on Jul. 27, 2017The above applications are hereby expressly incorporated by reference, in their entirety, into the present application.

BACKGROUND OF THE INVENTION

1. Field of the Invention

The present invention relates to a conductive member for a touch panel having a mesh pattern composed of a plurality of mesh cells composed of thin metallic wires, and a touch panel, and particularly, to a conductive member for a touch panel in which it is hard to visually recognize intersections of a mesh, and a touch panel in which it is hard to visually recognize intersections of a mesh while detection sensitivity is maintained.

2. Description of the Related Art

In a touch panel having a mesh electrode formed of thin metallic wires as a touch detection electrode, a lower resistance and a lower parasitic capacitance are possible than in a touch panel using a transparent electrode formed of an indium tin oxide (ITO) as a detection electrode. In a case where a mesh electrode formed of thin metallic wires is used, a high-sensitivity touch panel can be obtained. Accordingly, it has been frequently used in recent years, and attracted attention.

However, in a case where the above-described thin metallic wires are used, there may be a problem related to visibility in that the thin metallic wires are seen. For example, US2014/0216783A describes a micro-wire pattern having offset intersections such that the intersections have three intersecting elements. In US2014/0216783A, offset intersections are provided to make the intersections smaller, thereby reducing the visibility of the intersections.

In addition to the fact that the thin metallic wires are seen, there may be a problem related to visibility in that moire is visually recognized or density unevenness is visually recognized.

Regarding this, in a touch panel sensor having a detection electrode including a conductive mesh defining a plurality of opening regions in JP2015-143978A, the conductive mesh includes a conductive connecting element which extends between two branch points and defines an opening region. In JP2015-143978A, each branch point of the conductive mesh is positioned at a position on one intersection of a reference mesh pattern which is formed of a plurality of line segments extending between two intersections and defining opening regions and in which opening regions periodically arranged, or at a position displaced by a predetermined distance or less from the above one intersection. In addition, each connecting element of the conductive mesh extends between two branch points respectively corresponding to two intersections positioned at both ends of one line segment.

In JP2017-027466A, a touch panel sensor is provided with a detection electrode which includes a conductive mesh defining a plurality of opening regions. The conductive mesh is formed of thin conductive wires disposed in a pattern defining hexagonal opening regions which are arranged at a constant pitch respectively in a first direction and a second direction orthogonal to each other.

SUMMARY OF THE INVENTION

In US2014/0216783A, although visibility is improved by providing offset intersections as intersections of micro-wires, the visibility is not sufficiently improved. In JP2015-143978A and JP2017-027466A, both moire and density unevenness are made invisible. However, these are not made sufficiently invisible. At present, in a case where the above-described thin metal wires are used, it cannot be said that a sufficient measure is made for the problem related to visibility such as the fact that the thin metal wires are seen.

Particularly, in a touch panel having a mesh electrode formed of thin metal wires, a problem occurs in visibility of the thin metal wires in the mesh electrode having intersection thickening in which intersections of the mesh are thickened. Particularly, in a mesh electrode having mesh intersection thickening in which an intersection thickening index (the area of an intersection portion of the mesh/the square of a line width of the thin metal wires of the mesh) is 2.0 or greater, a significant problem occurs in visibility, and a measure therefor is not sufficient.

The method of measuring the above-described intersection thickening index (the area of an intersection portion of the mesh/the square of a line width of the thin metal wires of the mesh) will be described later, but the intersection thickening index is an average value at 5 intersections of the mesh. The line width of the thin metal wires is measured at a midpoint (a midpoint of a side of a mesh cell) between the intersections of the mesh. The line width of the thin metal wires is an average value of the line widths of the lines extending from the intersections of the mesh. In a case where the mesh pattern has a quadrangle mesh shape, an average value of the line widths of four thin metal wires extending from the intersections is used.

An object of the present invention is to provide a conductive member for a touch panel and a touch panel which solve the above-described problems based on the related art and have excellent visibility.

In order to achieve the above-described object, the present invention provides a conductive member for a touch panel comprising: a transparent insulating substrate; and a first conductive layer which is formed on the transparent insulating substrate, in which the first conductive layer has a first mesh pattern which is composed of a plurality of first mesh cells having a closed shape and formed of thin metal wires, the number of directional components in which vertices of the plurality of first mesh cells are arranged in a straight line is 1 or less, and the number of directional components in which vertices of the plurality of first mesh cells are arranged in a straight line represents the number of sets of parallel line segments, each of the line segments passing through four or more vertices of four or more of the plurality of first mesh cells which are continuously arranged in a straight line.

It is preferable that the number of directional components in which the vertices of the plurality of first mesh cells of the first conductive layer are arranged in a straight line is 1.

It is preferable that the closed shape of the first mesh pattern is an N-polygon, and N is 3 or greater. It is more preferable that the N-polygon is a quadrangle.

It is preferable that the conductive member for a touch panel further comprises: a second conductive layer which is electrically insulated from the first conductive layer and spaced apart from the first conductive layer, in which the second conductive layer has a second mesh pattern which is composed of a plurality of second mesh cells having a closed shape and formed of thin metal wires, the number of directional components in which vertices of the plurality of second mesh cells are arranged in a straight line is 1 or less, the number of directional components in which vertices of the plurality of second mesh cells are arranged in a straight line represents the number of sets of parallel line segments, each of the line segments passing through four or more vertices of four or more of the plurality of second mesh cells which are continuously arranged in a straight line, and the vertices of the plurality of second mesh cells are disposed in the corresponding first mesh cells, respectively in a case where the vertices are viewed from a lamination direction of the first conductive layer and the second conductive layer overlapping each other.

It is preferable that the number of directional components in which vertices of the plurality of first mesh cells of the first conductive layer are arranged in a straight line and the number of directional components in which vertices of the plurality of second mesh cells of the second conductive layer are arranged in a straight line are all 1, and the directional component in which vertices of the plurality of first mesh cells of the first conductive layer are arranged in a straight line and the directional component in which vertices of the plurality of second mesh cells of the second conductive layer are arranged in a straight line intersect.

It is preferable that the closed shape of the second mesh pattern is an S-polygon, and S is 3 or greater. It is more preferable that the S-polygon is a quadrangle.

The present invention provides a touch panel comprising: the above-described conductive member for a touch panel according to the embodiment of the present invention.

According to the present invention, it is possible to provide a conductive member for a touch panel and a touch panel having excellent visibility. Particularly, it is possible to obtain excellent visibility in a mesh electrode for a touch panel formed of thin metal wires having intersection thickening.

DESCRIPTION OF THE PREFERRED EMBODIMENTS

Hereinafter, a conductive member for a touch panel and a touch panel according to an embodiment of the present invention will be described in detail based on preferable embodiments shown in the accompanying drawings.

The drawings to be described below are merely illustrative of some embodiments of the present invention, and the present invention is not limited to the following drawings.

In the following description, the expression "to" indicating a numerical value range includes numerical values on both sides of "to". For example, in a case where $\varepsilon$ is a numerical value $\alpha$ to a numerical value $\beta$, the range of $\varepsilon$ includes the numerical values $\alpha$ and $\beta$, and is expressed as $\alpha \leq \varepsilon \leq \beta$ using mathematical symbols.

An angle such as "an angle represented by a specific numerical value", "parallel", "perpendicular", or "orthogonal" includes an error range typically accepted in the corresponding technical field unless otherwise specified.

The expression "the same" includes an error range typically accepted in the corresponding technical field.

The expression transparent means that the light transmittance is 40% or greater, preferably 80% or greater, and more preferably 90% or greater in a visible light wavelength range ranging from 380 to 780 nm.

The light transmittance is measured using, for example, "Plastics—Determination of Total Luminous Transmittance and Reflectance" specified in JIS (Japanese Industrial Standards) K 7375: 2008.

Figure 1:
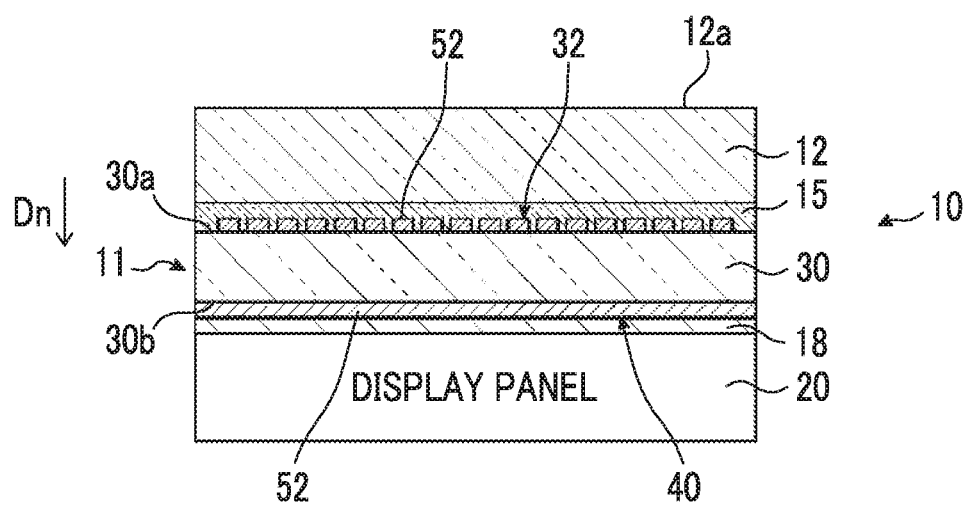
FIG. 1 is a cross-sectional view schematically showing an example of a configuration of a touch panel having a conductive member for a touch panel according to an embodiment of the present invention.
Figure 2:
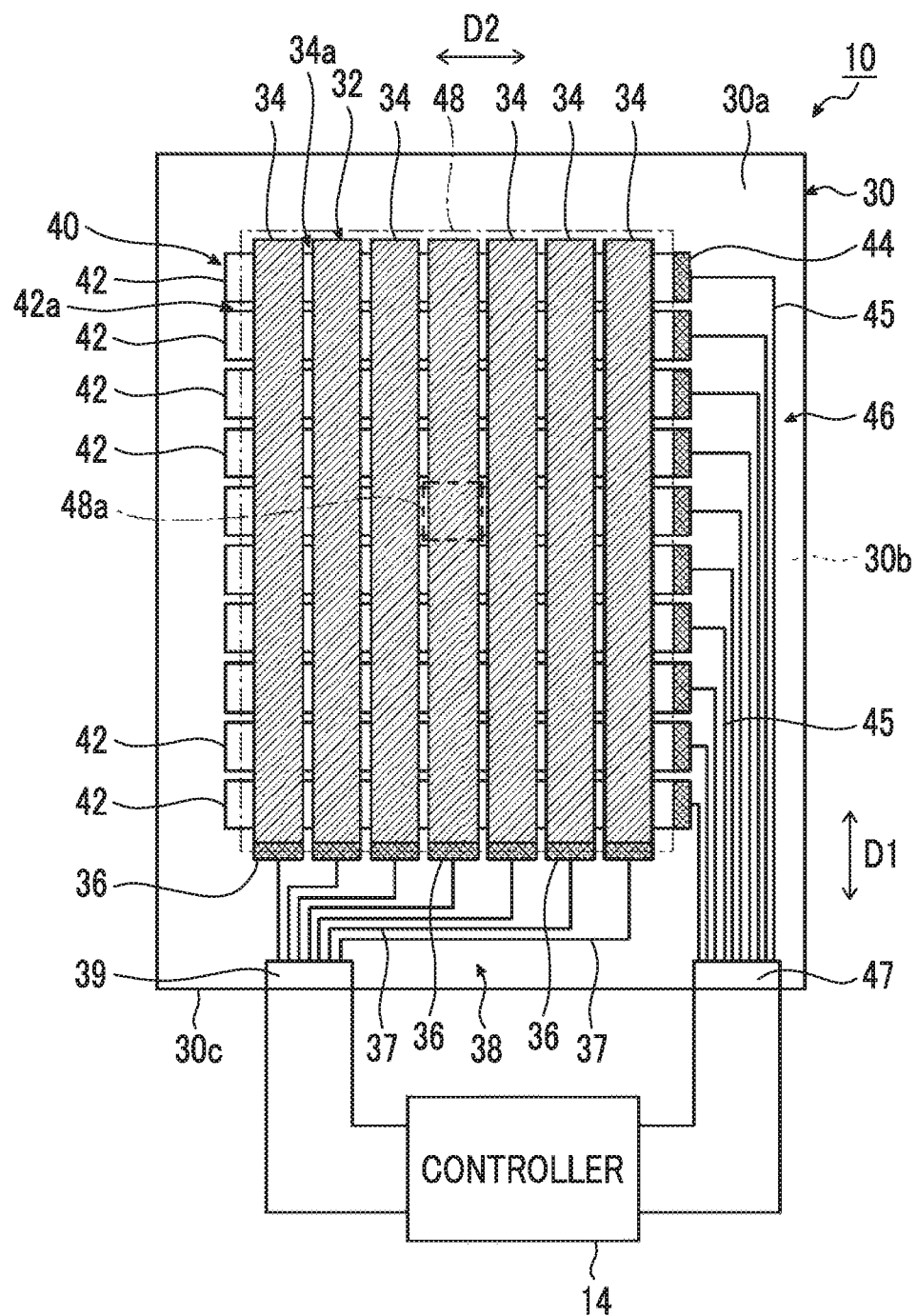
FIG. 2 is a plan view schematically showing a configuration of the touch panel having the conductive member for a touch panel according to the embodiment of the present invention.

FIG. 1 is a cross-sectional view schematically showing an example of a configuration of a touch panel having a conductive member for a touch panel according to an embodiment of the present invention. FIG. 2 is a plan view schematically showing a configuration of the touch panel having the conductive member for a touch panel according to the embodiment of the present invention. In FIG. 2, illustration of a transparent layer 15 and a cover layer 12 is omitted.

A touch panel 10 shown in FIG. 1 has a conductive member 11 for a touch panel. The conductive member 11 for a touch panel shown in FIG. 1 has a transparent insulating substrate 30 and a first conductive layer 32 and a second conductive layer 40 formed on the transparent insulating substrate 30, and at least one of the first conductive layer 32 or the second conductive layer 40 may be provided.

A transparent layer 15 and a cover layer 12 are laminated on the conductive member 11 for a touch panel. A front surface 12a of the cover layer 12 is a touch face of the touch panel 10 and serves as an operation face. The touch face refers to a face which detects a contact of a finger or a member such as a stylus pen. A controller 14 (see FIG. 2) is connected to the conductive member 11 for a touch panel.

The conductive member 11 for a touch panel, the cover layer 12, and the controller 14 constitute the touch panel 10. The touch panel 10 is provided on a display panel 20 via, for example, a transparent layer 18. In this case, the front surface 12a of the cover layer 12 serves as a surface where a display object (not shown) displayed in a display region (not shown) of the display panel 20 is visually recognized. The touch panel 10 and the display panel 20 constitute a display device.

The controller 14 is composed of a known controller which is used for the detection of an electrostatic capacitance-type touch sensor. In the touch panel 10, the controller 14 detects a position where the electrostatic capacity changes due to a contact of a finger or the like to the front surface 12a of the cover layer 12. The touch panel 10 includes the conductive member 11 for a touch panel as described above. The touch panel 10 including the conductive member 11 for a touch panel is suitably used as an electrostatic capacitance-type touch panel. Electrostatic capacitance-type touch panels include mutual capacitance-type touch panels and self-capacitance-type touch panels, and the above touch panel is particularly most suitable as a mutual capacitance-type.

The cover layer 12 functions as a protective layer of the conductive member 11 for a touch panel. The configuration of the cover layer 12 is not particularly limited. For example, glass such as plate glass or reinforced glass, or an acrylic resin such as polycarbonate (PC), polyethylene terephthalate (PET), or a polymethylmethacrylate resin (PMMA) is used for the cover layer 12. Since the front surface 12a of the cover layer 12 serves as a touch face as described above, a hard coat layer may be provided on the front surface 12a as necessary. The thickness of the cover layer 12 is 0.1 to 1.3 mm, and is particularly preferably 0.1 to 0.7 mm.

The transparent layer 18 is optically transparent and has an insulating property. In addition, the configuration thereof is not particularly limited as long as the transparent layer can stably fix the conductive member 11 for a touch panel and the display panel 20. As the transparent layer 18, for example, an optically transparent pressure sensitive adhesive (optical clear adhesive, OCA) or an optically transparent resin (optical clear resin, OCR) such as an ultraviolet (UV) curable resin can be used. The transparent layer 18 may be partially hollow.

A configuration may also be employed in which the conductive member 11 for a touch panel is provided on the display panel 20 with a gap therebetween without the transparent layer 18. The gap is also referred to as an air gap.

In addition, the transparent layer 15 is optically transparent and has an insulating property. In addition, the configuration thereof is not particularly limited as long as the transparent layer can stably fix the conductive member 11 for a touch panel and the cover layer 12. The same one as the transparent layer 18 can be used as the transparent layer 15.

The display panel 20 is provided with a display region (not shown), and is, for example, a liquid crystal display panel. The display panel 20 is not limited to liquid crystal display panels, and may be an organic electroluminescence (EL) display panel.

The display device is an electronic device, but the electronic device is not limited to display devices. Examples of the electronic device include the above-described display device. Specific examples of the electronic device include cellular phones, smartphones, portable information terminals, car navigation systems, tablet terminals, notebook personal computers, and desktop personal computers.

The conductive member 11 for a touch panel is used for an electrostatic capacitance-type touch sensor, in particular, a mutual capacitance-type touch sensor.

In the conductive member 11 for a touch panel in FIG. 1, which is an example of this embodiment, a first conductive layer 32 is provided on a front surface 30a of the transparent insulating substrate 30. In addition, a second conductive layer 40 is provided on a rear surface 30b of the transparent insulating substrate 30.

In FIG. 1, the first conductive layer 32 is formed directly on the front surface 30a of the transparent insulating substrate 30, and the second conductive layer 40 is formed directly on the rear surface 30b. However, at least one underlayer (under coat layer) or adhesion reinforcing layer for enhancing adhesion between the conductive layer and the transparent insulating substrate, or at least another functional layer may be provided between the transparent insulating substrate 30 and the first conductive layer 32 and between the transparent insulating substrate 30 and the second conductive layer 40.

The cover layer 12 is laminated on the front surface 30a of the transparent insulating substrate 30, and the front surface 30a of the transparent insulating substrate 30 is on the touch face side, that is, on the contact detection side.

The first conductive layer 32 includes detection electrodes of the touch panel, and thin metal wires 52 of the first conductive layer 32 constitute a plurality of first electrodes 34 which are detection electrodes of the touch panel.

As illustrated in FIG. 2, the first electrodes 34 are long strip-like electrodes extending parallel to a first direction D1. The plurality of first electrodes 34 are arranged in parallel at intervals in a second direction D2 orthogonal to the first direction D1, and electrically insulated from each other.

The first conductive layer 32 has a first pad 36 which is electrically connected to the thin metal wire 52 (see FIG. 1) constituting the first electrode 34.

A first peripheral wire 37 is electrically connected to the first pad 36 of each first electrode 34. The first peripheral wires 37 are arranged close to each other, and the plurality of first peripheral wires 37 are individually connected to respective terminals for connection to the controller 14. The terminals are collected in one terminal connection region 39 at one side 30c of the transparent insulating substrate 30. The plurality of first peripheral wires 37 are collectively referred to as a first peripheral wiring portion 38.

The second conductive layer 40 includes detection electrodes of the touch panel, and thin metal wires 52 of the second conductive layer 40 constitute a plurality of second electrodes 42.

As shown in FIG. 2, the second electrodes 42 are long strip-like electrodes extending parallel to a second direction D2. The plurality of second electrodes 42 are arranged in parallel at intervals in the first direction D1 orthogonal to the second direction D2, and electrically insulated from each other.

The second conductive layer 40 has the same configuration as the above-described first conductive layer 32. The second conductive layer 40 has a second pad 44 which is electrically connected to the thin metal wire 52 (see FIG. 1) constituting the second electrode 42.

A second peripheral wire 45 is electrically connected to the second pad 44 of each second electrode 42. The second peripheral wires 45 are arranged close to each other. The plurality of second peripheral wires 45 are individually connected to respective terminals for connection to the controller 14, and the terminals are collected in one terminal connection region 47 at one side 30c of the transparent insulating substrate 30. The plurality of second peripheral wires 45 are collectively referred to as a second peripheral wiring portion 46.

In the example of FIG. 1, the first conductive layer 32 and the second conductive layer 40 are electrically insulated by the transparent insulating substrate 30 and are spaced apart from each other. The layers may be laminated to be spaced apart from each other. The second electrode 42 of the second conductive layer 40 is disposed so as to at least partially overlap and intersect with the first electrode 34 of the first conductive layer 32 in a case where the second electrode is viewed from a lamination direction of the first conductive layer 32 and the second conductive layer 40 overlapping each other, that is, a direction Dn (see FIG. 1) vertical to the front surface 30a of the transparent insulating substrate 30. A portion where the first electrode 34 and the second electrode 42 overlap is an intersection portion 48a.

In the touch panel 10, as shown in FIG. 1, the first conductive layer 32 is provided on the front surface 30a of one transparent insulating substrate 30, and the second conductive layer 40 is provided on the rear surface 30b. Accordingly, a deviation in the positional relationship between the first conductive layer 32 and the second conductive layer 40 can be reduced even in a case where the transparent insulating substrate 30 contracts.

Each of the first peripheral wire 37 and the second peripheral wire 45 is formed of, for example, a conductor wire. The constituent members of the touch panel 10 including the conductive member 11 for a touch panel will be described in detail later.

In the touch panel 10, a region where the plurality of first electrodes 34 and the plurality of second electrodes 42 are disposed to overlap each other in plan view in a case where the region is viewed from the direction Dn (see FIG. 1) vertical to the front surface 30a of the transparent insulating substrate 30 is a sensing region 48 shown in FIG. 2, which is a sensor region detecting a touch.

The sensing region 48 is a region capable of detecting a contact of a finger or the like, that is, a touch in an electrostatic capacitance-type touch panel.

The conductive member 11 for a touch panel is disposed on the display region of the display panel 20, and the sensing region 48 is disposed so as to overlap a pixel display region where a display image of the display panel 20 (see FIG. 1) is displayed. The sensing region 48 may be wider than the pixel display region.

For example, a decorative layer (not shown) having a light shielding function is provided in a region where the first peripheral wiring portion 38 and the second peripheral wiring portion 46 are formed. The first peripheral wiring portion 38 and the second peripheral wiring portion 46 are made invisible by covering the first peripheral wiring portion 38 and the second peripheral wiring portion 46 with the decorative layer.

The configuration of the decorative layer is not particularly limited as long as the decorative layer can make the first peripheral wiring portion 38 and the second peripheral wiring portion 46 invisible, and a known decorative layer can be used. For forming the decorative layer, various printing methods such as a screen printing method, a gravure printing method, and an offset printing method, transfer methods, and vapor deposition methods can be used, and the decorative layer is formed on the cover layer 12. The decorative layer may be formed directly on the first peripheral wiring portion 38 and the second peripheral wiring portion 46.

Figure 3:
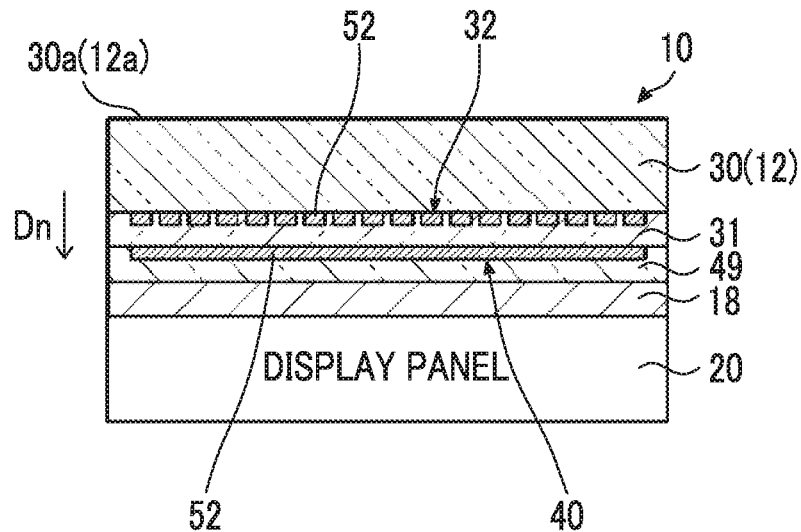
FIG. 3 is a cross-sectional view schematically showing another example of the configuration of the touch panel having the conductive member for a touch panel according to the embodiment of the present invention.

The touch panel 10 is not particularly limited to the configuration shown in FIGS. 1 and 2. For example, as in a touch panel 10 shown in FIG. 3, a single side lamination configuration may also be employed in which a first conductive layer 32 is formed on a transparent insulating substrate 30, an insulating film 31 is formed on the first conductive layer 32, a second conductive layer 40 is provided on the insulating film 31 such that the first conductive layer 32 and the second conductive layer 40 are laminated via the insulating film 31. In this case, the transparent insulating substrate 30 also serves as a cover layer 12, and the first conductive layer 32 is disposed on the touch face side. A transparent layer 49 which covers the second conductive layer 40 is formed on the insulating film 31, and is provided on a display panel 20 via a transparent layer 18.

The insulating film 31 may have the same configuration as the transparent insulating substrate 30, or a different configuration. The transparent layer 49 can be the same as the above-described transparent layer 18. In the configuration shown in FIG. 3, a lamination direction of the first conductive layer 32 and the second conductive layer 40 overlapping each other is the same direction as the vertical direction Dn.

Although not shown in the drawing, the conductive member 11 for a touch panel may have a lamination configuration in which a conductive member 11 for a touch panel in which a first conductive layer 32 is provided on one transparent insulating substrate 30 and another conductive member for a touch panel (not shown) in which a second conductive layer 40 is provided on another transparent insulating substrate (not shown) are bonded via an optically transparent pressure sensitive adhesive. That is, the first conductive layer 32 and the second conductive layer 40 may be insulated and opposed to each other.

Next, the first conductive layer and the second conductive layer of the conductive member 11 for a touch panel will be described.

Figure 4:
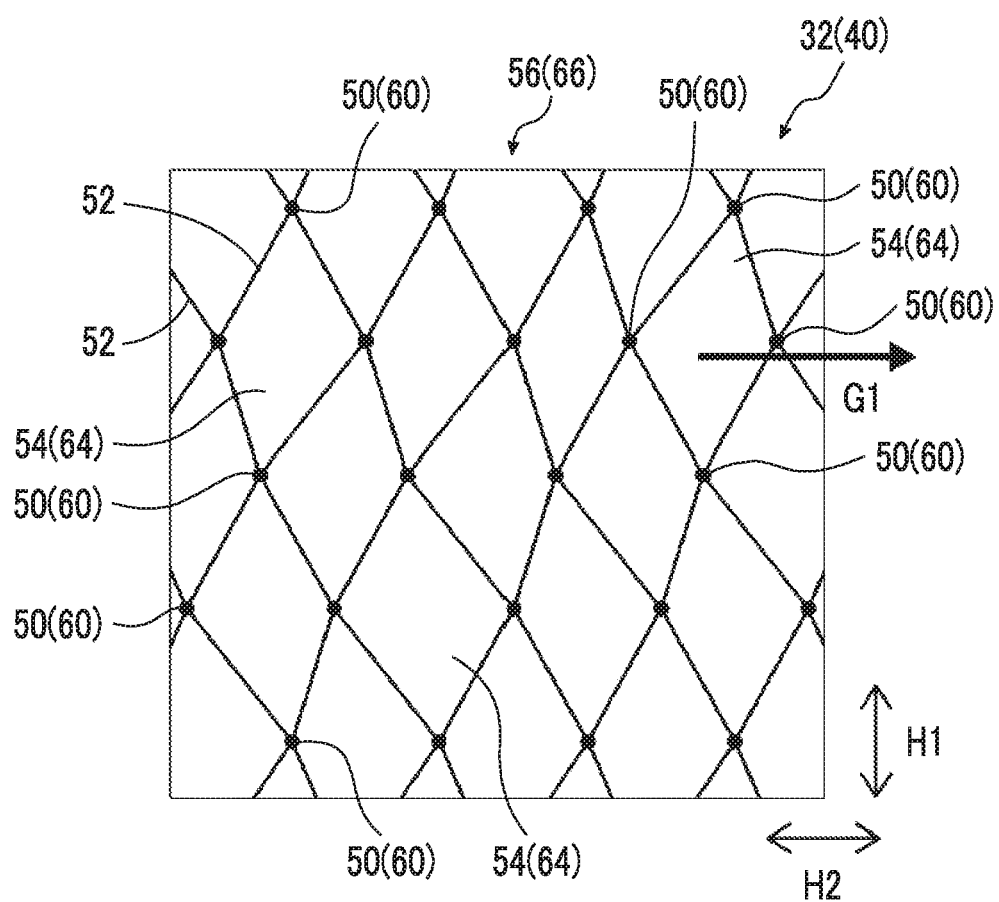
FIG. 4 is a schematic diagram showing a first example of a first conductive layer and a second conductive layer of the conductive member for a touch panel according to the embodiment of the present invention.
Figure 5:
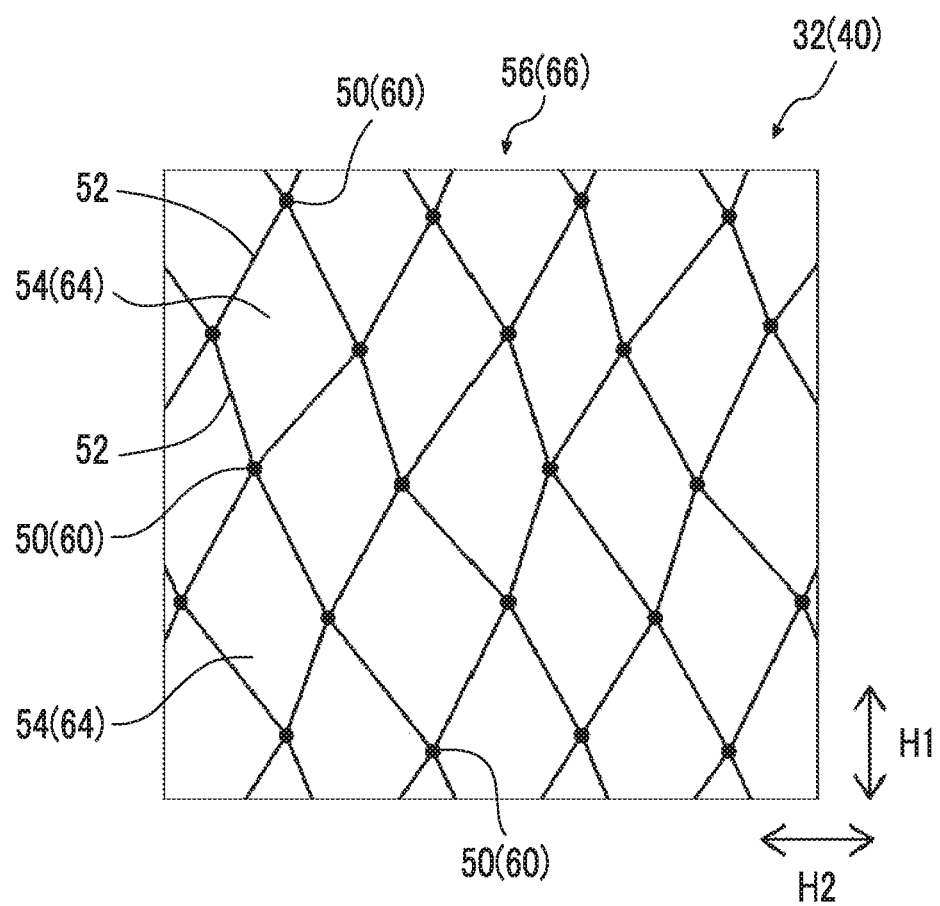
FIG. 5 is a schematic diagram showing a second example of the first conductive layer and the second conductive layer of the conductive member for a touch panel according to the embodiment of the present invention.
Figure 6:
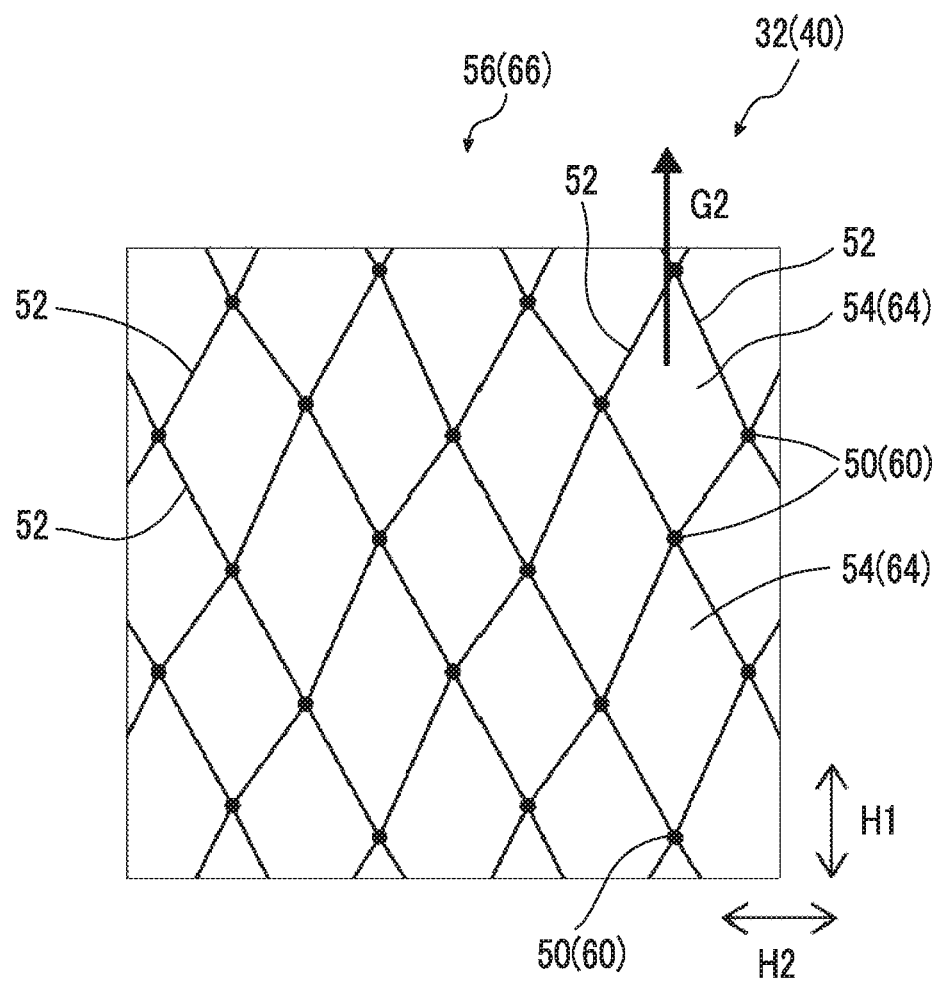
FIG. 6 is a schematic diagram showing a third example of the first conductive layer and the second conductive layer of the conductive member for a touch panel according to the embodiment of the present invention.
Figure 7:
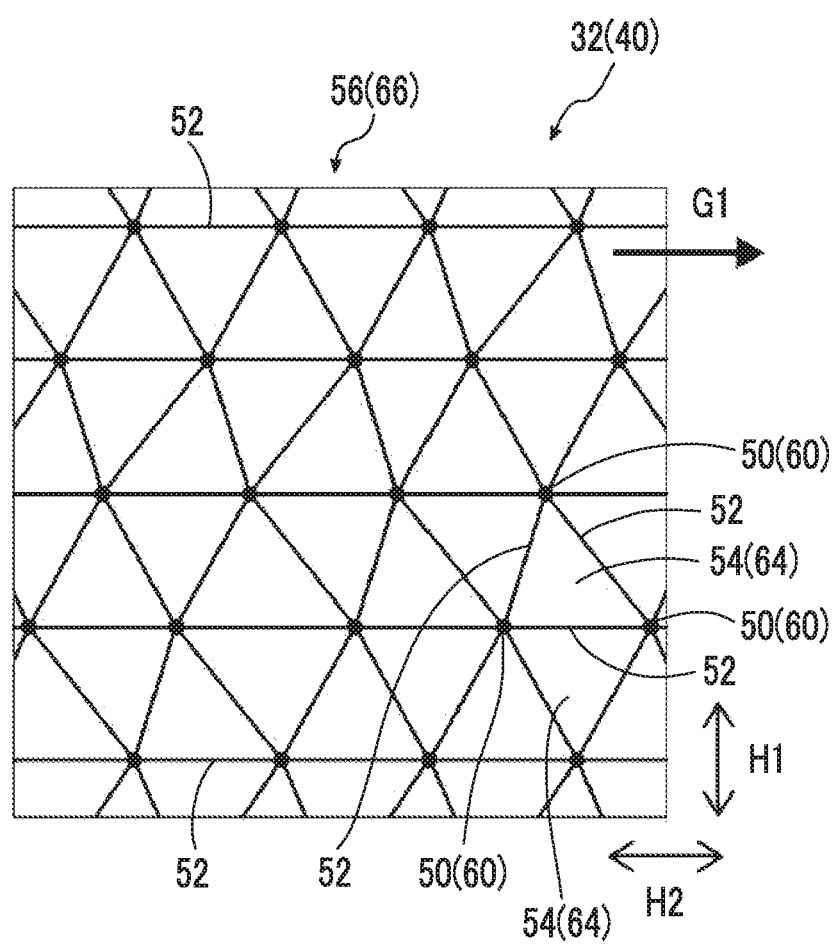
FIG. 7 is a schematic diagram showing a fourth example of the first conductive layer and the second conductive layer of the conductive member for a touch panel according to the embodiment of the present invention.
Figure 8:
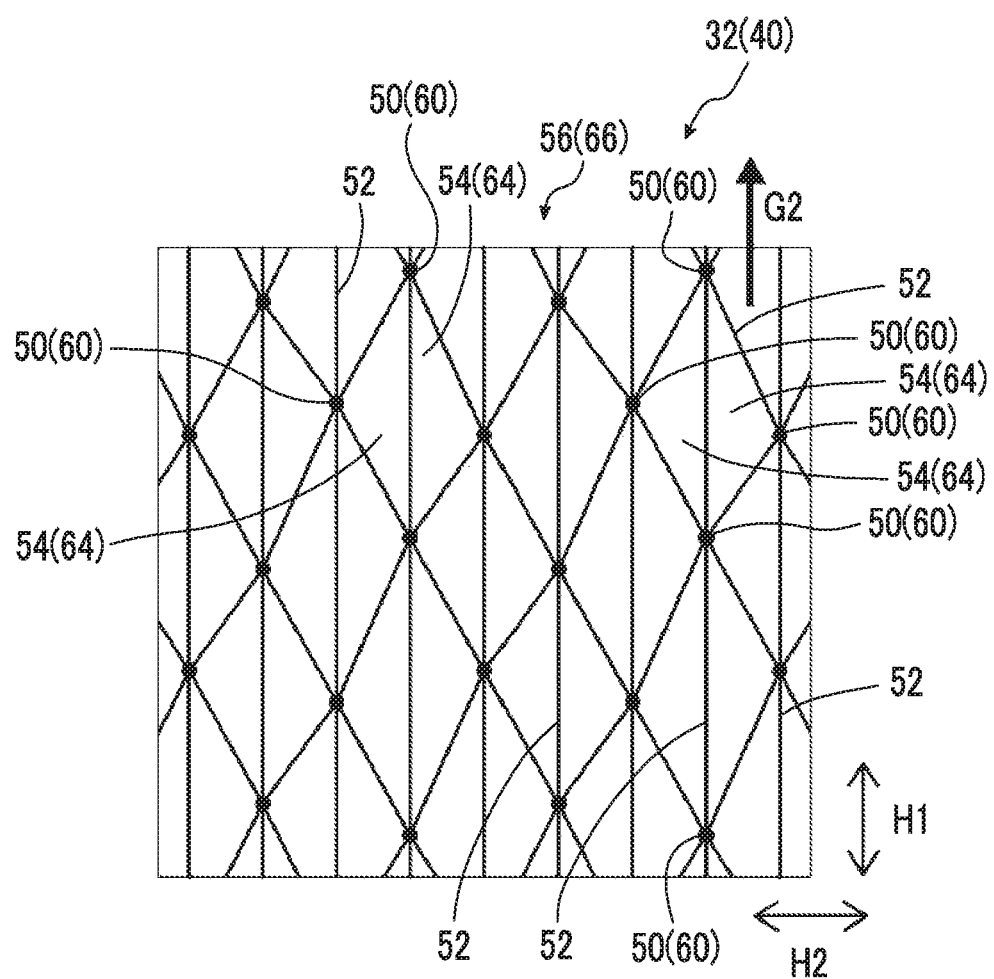
FIG. 8 is a schematic diagram showing a fifth example of the first conductive layer and the second conductive layer of the conductive member for a touch panel according to the embodiment of the present invention.

FIG. 4 is a schematic diagram showing a first example of the first conductive layer and the second conductive layer of the conductive member for a touch panel according to the embodiment of the present invention, FIG. 5 is a schematic diagram showing a second example of the first conductive layer and the second conductive layer of the conductive member for a touch panel according to the embodiment of the present invention, and FIG. 6 is a schematic diagram showing a third example of the first conductive layer and the second conductive layer of the conductive member for a touch panel according to the embodiment of the present invention. FIG. 7 is a schematic diagram showing a fourth example of the first conductive layer and the second conductive layer of the conductive member for a touch panel according to the embodiment of the present invention, and FIG. 8 is a schematic diagram showing a fifth example of the first conductive layer and the second conductive layer of the conductive member for a touch panel according to the embodiment of the present invention.

Each of FIGS. 4 to 8 illustrates a pattern viewed in plan view, in which the first conductive layer 32 and the second conductive layer 40 overlap. In FIGS. 4 to 8, the reference H1 indicates an extending direction of the first electrode 34 of the first conductive layer 32 and the second electrode 42 of the second conductive layer 40. The reference H2 indicates a direction orthogonal to the extending direction of the first electrode 34 of the first conductive layer 32 and the second electrode 42 of the second conductive layer 40. For example, the extending direction H1 is the above-described first direction D1 in the first conductive layer 32, and is the above-described second direction D2 in the second conductive layer 40. The black circles shown in FIGS. 4 to 8 represent vertices 50 of first mesh cells 54 and vertices 60 of second mesh cells 64.

As shown in FIG. 4, the first conductive layer 32 has a first mesh pattern 56 configured by connecting a plurality of first mesh cells 54 having a closed shape and formed by connecting a plurality of vertices 50 by thin metal wires 52. The first mesh cell 54 shown in FIG. 4 is a quadrangle. The vertex 50 is a region where at least two thin metal wires 52 are in contact with each other, and is configured by, for example, the thin metal wires 52 intersecting with each other.

In the first conductive layer 32, the number of directional components in which the vertices 50 of the plurality of first mesh cells 54 are arranged in a straight line is 1 or less. The fact the number of directional components in which the vertices of the mesh cells are arranged in a straight line is 1 or less means that the number of directional components in which the vertices of the mesh cells are arranged in a straight line is 0 or 1. It is preferable that the number of directional components in which the vertices of the mesh cells of the first conductive layer 32 are arranged in a straight line is 1. This is because noise is suppressed in a case where the number of directional components in which the vertices of the mesh cells are arranged in a straight line is 1. In a case where there is noise, an observer may receive a feeling of roughness or graininess in a case where the observer looks at the touch panel or the conductive member for a touch panel. The directional component in which the vertices of the mesh cells are arranged in a straight line will be described in detail later.

Figure 13:
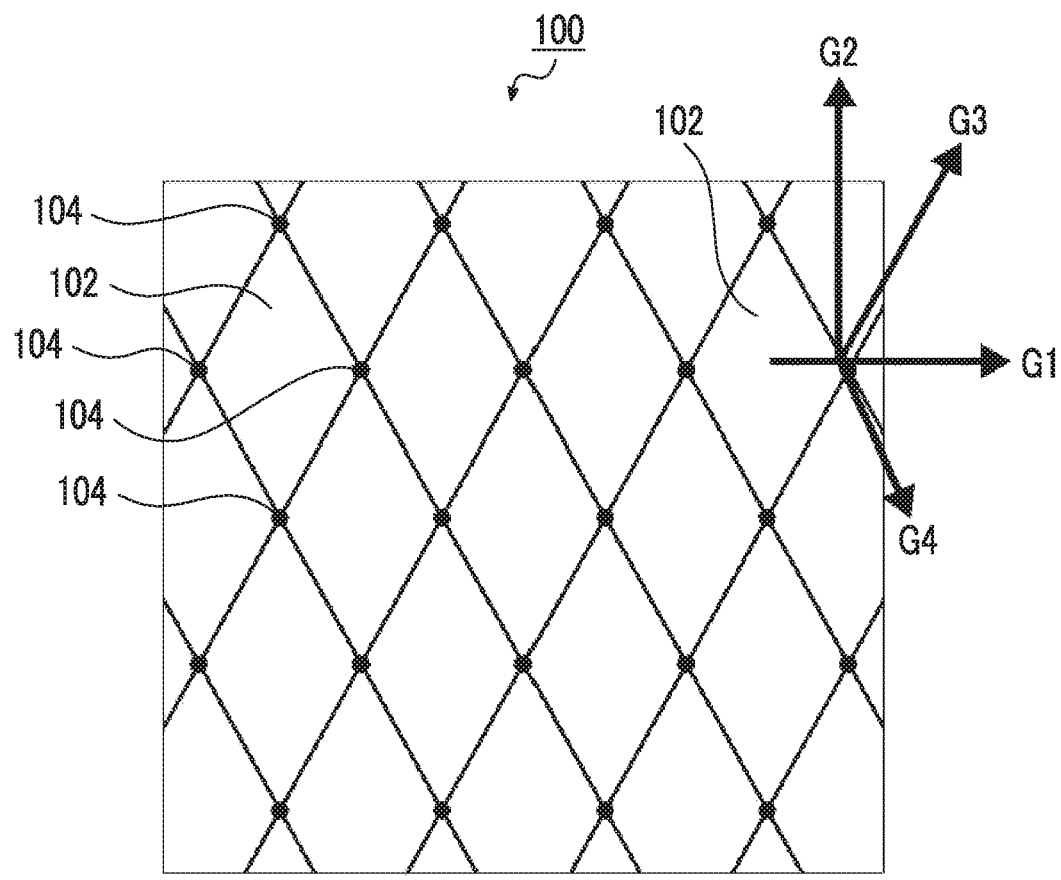
FIG. 13 is a plan view schematically showing an example of a mesh pattern.

A mesh pattern 100 shown in FIG. 13 is a fixed mesh pattern in which the same rhombus mesh cells 102 are repeatedly disposed. In the mesh pattern 100 of FIG. 13, vertices 104 of the mesh cells 102 are disposed such that the number of directional components in which the vertices of the mesh cells are arranged in a straight line is 4, and there are directions G1, G2, G3, and G4 of the directional components in which the vertices of the mesh cells are arranged in a straight line. In this case, since all the vertices 104 of the mesh cells 102 are arranged in a straight line, the vertices 104 of the mesh cells 102 are visible, and visibility deteriorates. The vertex of a mesh cell is also called an intersection of the mesh.

Figure 14:
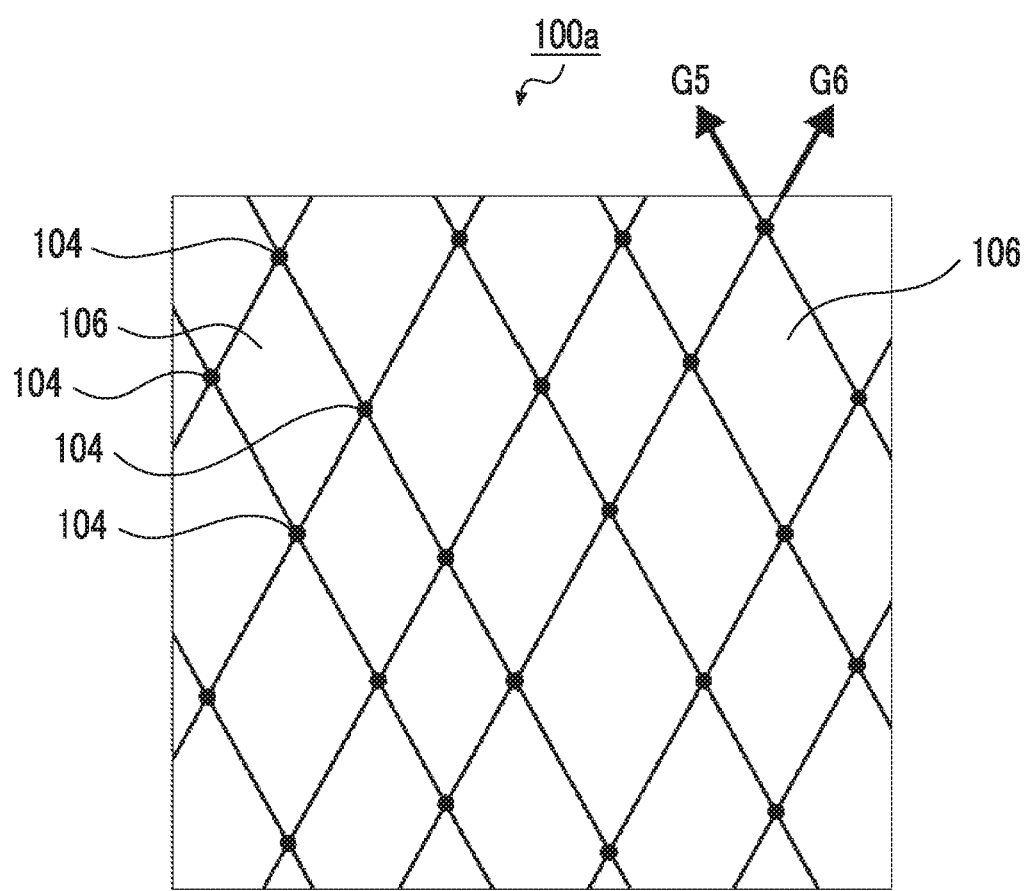
FIG. 14 is a plan view schematically showing another example of the mesh pattern.

A mesh pattern 100a shown in FIG. 14 is a mesh pattern in which the thin metal wires are randomly moved in parallel in the fixed rhombus mesh pattern of FIG. 13. In the mesh pattern 100a shown in FIG. 14, vertices 104 of mesh cells 106 are disposed such that the number of directional components in which the vertices of the mesh cells are arranged in a straight line is 2, and there are directions G5 and G6 of the directional components in which the vertices of the mesh cells are arranged in a straight line. In this case, since all the vertices 104 of the mesh cells 106 are also arranged in a straight line, the vertices 104 of the mesh cells 106 are visible, and visibility deteriorates. As described above, in a case where the number of directional components in which the vertices of the mesh cells are arranged in a straight line exceeds 1, the vertices of the mesh cells are visible, and visibility deteriorates. The black circles shown in FIGS. 13 and 14 represent vertices 104 of first mesh cells 106.

The configuration of the second conductive layer 40 is not particularly limited, and preferably has the same configuration as the first conductive layer 32.

In this case, for example, the second conductive layer 40 has a second mesh pattern 66 configured by connecting second mesh cells 64 having a closed shape and formed by connecting a plurality of vertices 60 by thin metal wires 52. The second mesh cell 64 shown in FIG. 4 is a quadrangle. It is preferable that the number of directional components in which the vertices 60 of the plurality of second mesh cells 64 are arranged in a straight line is 1 or less in the second conductive layer 40.

The vertex 60 is the same as the vertex 50, is a region where at least two thin metal wires 52 are in contact with each other, and is configured by, for example, the thin metal wires 52 intersecting with each other.

In both the first conductive layer 32 and the second conductive layer 40 shown in FIG. 4, the number of directional components in which the vertices of the mesh cells are arranged in a straight line is 1, and the direction G1 of the directional component in which the vertices of the mesh cells are arranged in a straight line is parallel to the direction H2.

As shown in FIG. 5, in the first conductive layer 32, the number of directional components in which the vertices of the mesh cells are arranged in a straight line may be 0. In this case, as will be described in detail later, the vertices 50 are not disposed on a straight line across four or more first mesh cells 54. In addition, in the four or more first mesh cells 54, there is no straight line parallel to the above line even in a case where the vertices 50 are disposed on a straight line. In the example shown in FIG. 5, the first mesh cell 54 is also a quadrangle.

In FIG. 5, in the second conductive layer 40, the number of directional components in which the vertices of the mesh cells are arranged in a straight line is also 0. The vertices 60 are not disposed on a straight line across four or more second mesh cells 64. In addition, in the four or more second mesh cells 64, there is no straight line parallel to the above line even in a case where the vertices 60 are disposed on a straight line. In the example shown in FIG. 5, the second mesh cell 64 is also a quadrangle.

In the first conductive layer 32 shown in FIG. 6, the number of directional components in which the vertices of the mesh cells are arranged in a straight line is 1, and the direction G2 of the directional component in which the vertices of the mesh cells are arranged in a straight line is parallel to the extending direction H1. The first conductive layer 32 shown in FIG. 6 has the same configuration as the first conductive layer 32 shown in FIG. 4, except that the direction of the directional component in which the vertices of the mesh cells are arranged in a straight line is different. Therefore, detailed description of the first conductive layer 32 shown in FIG. 6 will be omitted.

The second conductive layer 40 shown in FIG. 6 also has the same configuration as the second conductive layer 40 shown in FIG. 4, except that the direction of the directional component in which the vertices of the mesh cells are arranged in a straight line is different. Therefore, detailed description of the second conductive layer 40 shown in FIG. 6 will be omitted.

Both the first mesh cell 54 of the first conductive layer 32 and the second mesh cell 64 of the second conductive layer 40 shown in FIG. 6 are quadrangles.

In the first conductive layer 32 shown in FIG. 7, the number of directional components in which the vertices of the mesh cells are arranged in a straight line is 1, and the direction G1 of the directional component in which the vertices of the mesh cells are arranged in a straight line is orthogonal to the extending direction H1. The first conductive layer 32 shown in FIG. 7 has the same configuration as the first conductive layer 32 shown in FIG. 4, except that the first mesh cell 54 has a triangle shape. Therefore, detailed description of the first conductive layer 32 shown in FIG. 7 will be omitted.

The first conductive layer 32 is provided with thin metal wires 52 which pass through the vertices 50 and are parallel to the direction H2.

The second conductive layer 40 shown in FIG. 7 also has the same configuration as the second conductive layer 40 shown in FIG. 4, except that the second mesh cell 64 has a triangle shape. Therefore, detailed description of the second conductive layer 40 shown in FIG. 7 will be omitted.

The second conductive layer 40 is provided with thin metal wires 52 which pass through the vertices 60 and are parallel to the direction H2.

Both the first mesh cell 54 of the first conductive layer 32 and the second mesh cell 64 of the second conductive layer 40 shown in FIG. 7 are triangles.

In the first conductive layer 32 shown in FIG. 8, the number of directional components in which the vertices of the mesh cells are arranged in a straight line is 1, and the direction G2 of the directional component in which the vertices of the mesh cells are arranged in a straight line is parallel to the extending direction H1. The first conductive layer 32 shown in FIG. 8 has the same configuration as the first conductive layer 32 shown in FIG. 4, except that the direction of the directional component in which the vertices of the mesh cells are arranged in a straight line is different, and the first mesh cell 54 has a triangle shape. Therefore, detailed description of the first conductive layer 32 shown in FIG. 8 will be omitted.

The first conductive layer 32 is provided with thin metal wires 52 which pass through the vertices 50 and are parallel to the extending direction H1.

The second conductive layer 40 shown in FIG. 8 also has the same configuration as the second conductive layer 40 shown in FIG. 4, except that the direction of the directional component in which the vertices of the mesh cells are arranged in a straight line is different, and the second mesh cell 64 has a triangle shape. Therefore, detailed description of the second conductive layer 40 shown in FIG. 8 will be omitted.

The second conductive layer 40 is provided with thin metal wires 52 which pass through the vertices 60 and are parallel to the extending direction H1.

Both the first mesh cell 54 of the first conductive layer 32 and the second mesh cell 64 of the second conductive layer 40 shown in FIG. 8 are triangles.

As described above, the first mesh cell 54 shown in FIGS. 4 to 6 has a quadrangle shape, and the first mesh cell 54 shown in FIGS. 7 and 8 has a triangle shape. The closed shape of the first mesh cell 54 of the first mesh pattern 56 is not particularly limited, and is preferably an N-polygon. N is 3 or greater. The N-polygon is more preferably a quadrangle as shown in FIGS. 4 to 6 since moire between the display panel and the pixel pattern can be reduced.

In the first mesh cells 54, all the closed shapes are the same, but the present invention is not limited thereto. N-polygons satisfying N≥3 may be mixed in the first mesh cells 54. In this case, the first mesh cells may include, for example, a triangle, a quadrangle, a pentagon, and a hexagon. In addition, all the N-polygons have the same size, but the present invention is not limited thereto. All the N-polygons may have the same size, or N-polygons of different sizes may be mixed.

However, in order to suppress noise, it is preferable that the first mesh cells 54 have an N-polygonal shape in which N is constant, and the variation in area of the first mesh cells is within a range of average value ±20%. It is preferable that the first mesh cells are quadrangles, and the side length of a mesh cell randomly varies within a range of 4% to 10% from the average value from the viewpoint of suppressing both moire and noise.

In the closed shape of the first mesh cell 54, the vertices 50 of the closed shape are connected by linear thin metal wires 52 to form a N-polygon satisfying N≥3, but the present invention is not limited thereto. A plurality of sides are formed by connecting the vertices 50 by linear thin metal wires 52, but a shape in which at least one of the plurality of sides is substituted by a curved thin metal wire 52 may be provided as the closed shape.

In the second mesh cells 64, the closed shape is an S-polygon as in the first mesh cells 54, and S is 3 or greater, and preferably 4 to 6. The S-polygon is more preferably a quadrangle as shown in FIGS. 4 to 6 since moire between the display panel and the pixel pattern can be reduced.

In the second mesh cells 64, all the closed shapes are the same, but the present invention is not limited thereto. S-polygons in which S is 3 or greater may be mixed, or S-polygons having different sizes may be formed.

However, in order to suppress noise, it is preferable that the second mesh cells 64 are S-polygons in which S is constant, and the variation in area of the second mesh cells is within a range of average value ±20%. It is preferable that the second mesh cells are quadrangles, and the side length of a mesh cell randomly varies within a range of 4% to 10% from the average value from the viewpoint of suppressing both moire and noise.

In the closed shape of the second mesh cell 64, the vertices 50 are connected by linear thin metal wires 52, but the present invention is not limited thereto. The thin metallic wire may be curved.

In combination of the first conductive layer 32 and the second conductive layer 40, the layers have the same configuration, but the present invention is not limited thereto. The number of directional components in which the vertices of the mesh cells are arranged in a straight line may be the same or different, or the direction of the directional component in which the vertices of the mesh cells are arranged in a straight line may be the same or different. It is preferable that the directional component in which the vertices of the mesh cells of the first conductive layer 32 are arranged in a straight line and the directional component in which the vertices of the mesh cells of the second conductive layer 40 are arranged in a straight line intersect. The expression "the directional component and the directional component intersect" means that the directions of the directional components in which the vertices of the mesh cells are arranged in a straight line are not the same or parallel to each other.

In a case where the directional components in which the vertices of the mesh cells are arranged in a straight line intersect, it is hard to visually recognize the vertices 50 of the first mesh cells 54 and the vertices 60 of the second mesh cells 64 in a state in which the first conductive layer 32 and the second conductive layer 40 overlap, and thus visibility is improved. In addition, noise is also reduced and the detection sensitivity of the touch panel 10 is further increased. Particularly preferably, the direction of the directional component in which the vertices of the mesh cells of the first conductive layer 32 are arranged in a straight line and the direction of the directional component in which the vertices of the mesh cells of the second conductive layer 40 are arranged in a straight line are orthogonal to each other by 90 degrees from the viewpoint that it is hard to visually recognize the vertices 50 of the first mesh cells 54 and the vertices 60 of the second mesh cells 64.

Figure 9:
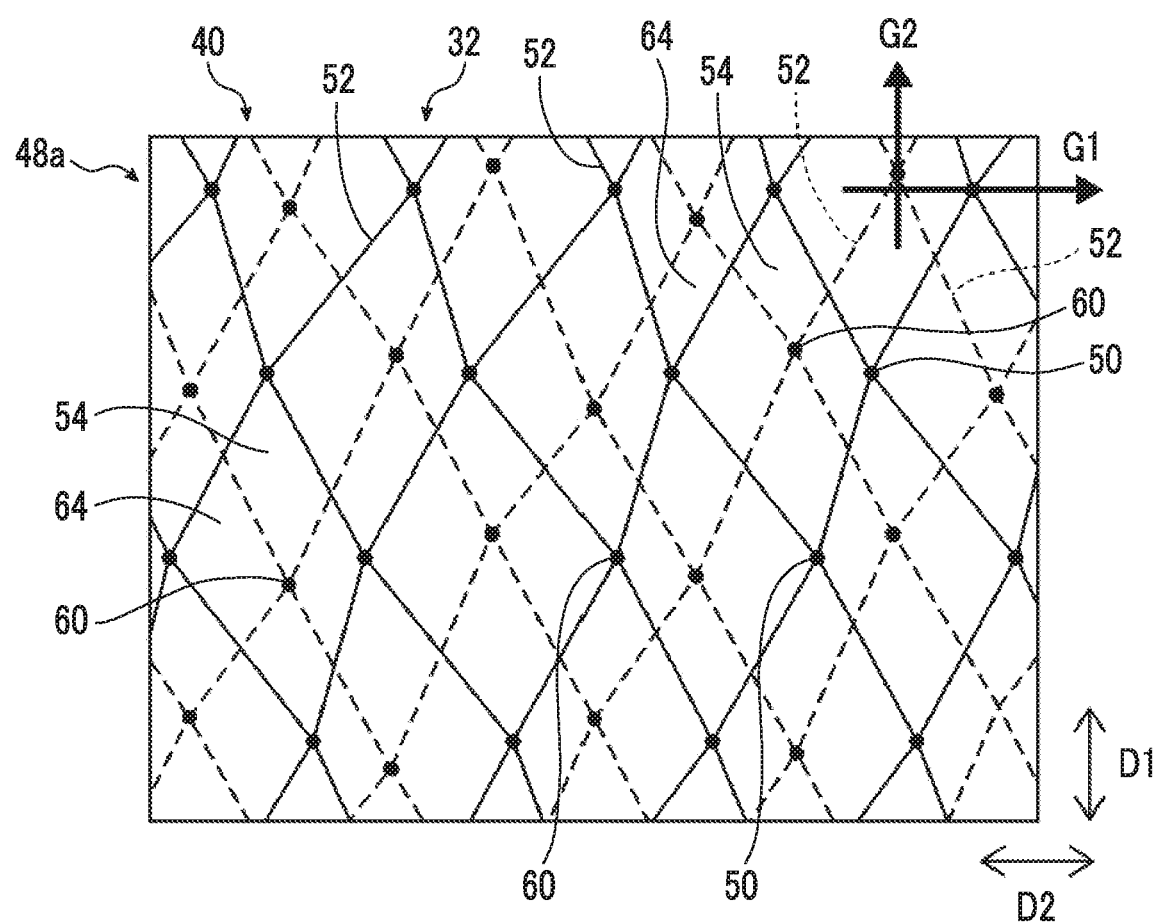
FIG. 9 is a schematic diagram showing an intersection portion of the touch panel according to the embodiment of the present invention.

As shown in FIG. 9, in the second conductive layer 40, the vertex 60 of the second mesh cell 64 is preferably disposed in the first mesh cell 54. FIG. 9 shows an intersection portion 48a. The first conductive layer 32 has the configuration shown in FIG. 4, and the second conductive layer 40 has the configuration shown in FIG. 6. The direction G1 of the directional component in which the vertices of the mesh cells are arranged in a straight line in FIG. 4 is orthogonal to the direction G2 of the directional component in which the vertices of the mesh cells are arranged in a straight line in FIG. 6. The black circles shown in FIG. 9 represents the vertices 50 of first mesh cells 54 and the vertices 60 of the second mesh cells 64.

In a case where the vertex 60 of the second mesh cell 64 is disposed in the first mesh cell 54, it is further hard to visually recognize the vertices 50 of the first mesh cells 54 and the vertices 60 of the second mesh cells 64, and thus visibility is improved. In addition, the detection sensitivity of the touch panel 10 is increased.

As shown in FIG. 2, the plurality of first electrodes 34 are disposed at intervals in the second direction D2, but a dummy electrode (not shown) may be disposed at an interelectrode space 34a between the first electrodes 34 adjacent to each other. Similarly to the first electrode 34, the dummy electrode is composed of mesh cells formed by the thin metallic wires 52 formed in the first conductive layer 32, and the dummy electrode is not electrically connected to the first electrode 34 adjacent thereto in the second direction D2. The dummy electrode is an electrically floating electrode and does not function as a detection electrode. Similarly to the first electrode 34, the mesh pattern of the dummy electrode formed in the first conductive layer 32 is composed of first mesh cells 54. With such a dummy electrode disposed at the interelectrode space 34a between the plurality of first electrodes 34, the gap of the interelectrode space 34a between the plurality of first electrodes 34 is invisible in a case where the conductive member 11 for a touch panel is used for the touch panel 10. Thus, visibility is improved.

For example, the first electrode 34 and the dummy electrode can be formed by patterning a plurality of thin metallic wires 52 formed in the whole front surface 30a of the transparent insulating substrate 30 into a mesh shape.

Similarly to the dummy electrode disposed at the interelectrode space 34a between the plurality of first electrodes 34, a dummy electrode (not shown) can also be disposed at an interelectrode space 42a between the plurality of second electrodes 42 in the second conductive layer 40. The gap of the interelectrode space 42a between the plurality of second electrodes 42 is invisible, and thus visibility of the touch panel 10 is improved.

Next, the directional component in which the vertices of the mesh cells are arranged in a straight line will be described.

Figure 10:
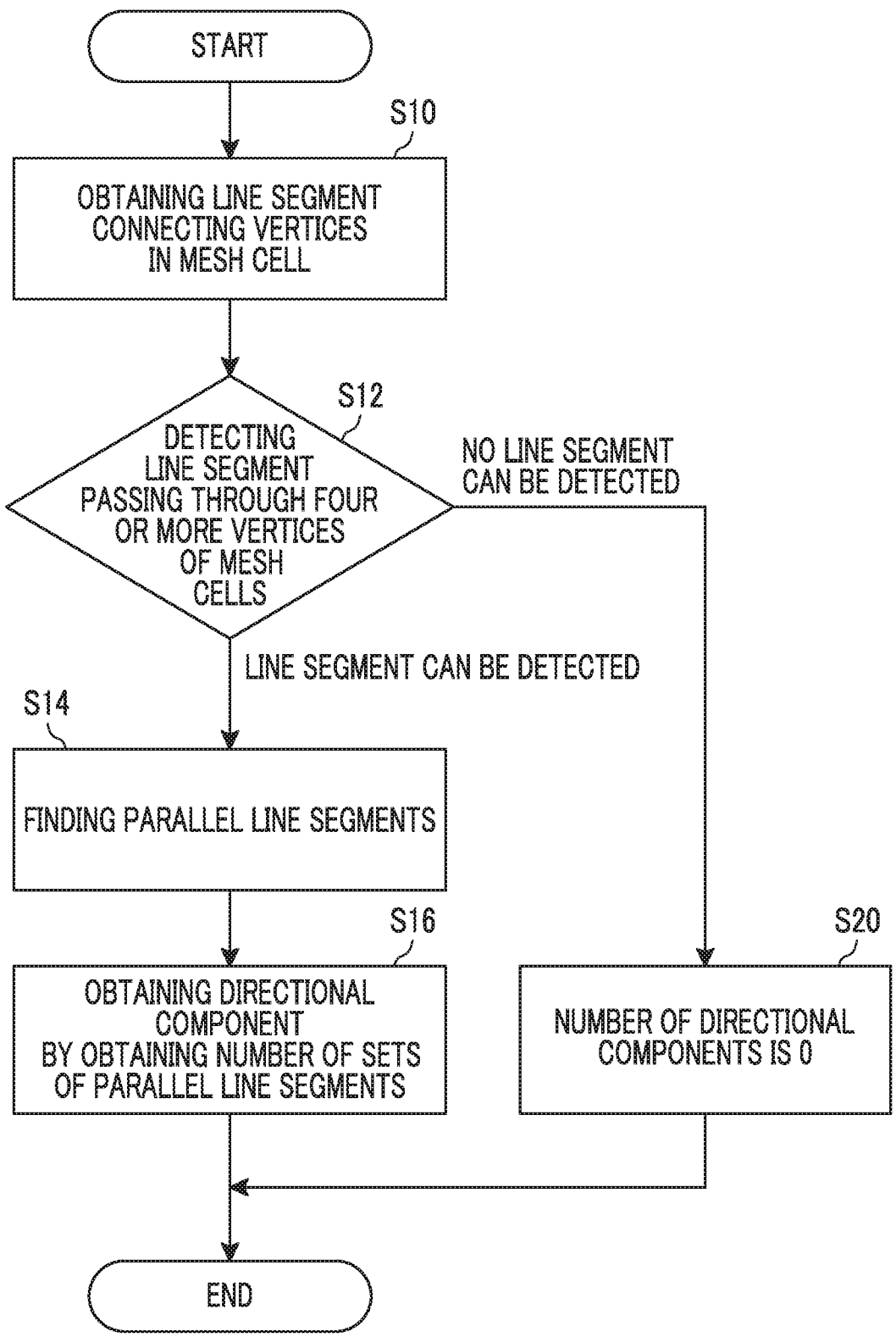
FIG. 10 is a flowchart showing a method of obtaining the number of directional component in which vertices of mesh cells of the conductive member for a touch panel according to the embodiment of the present invention are arranged in a straight line.
Figure 11:
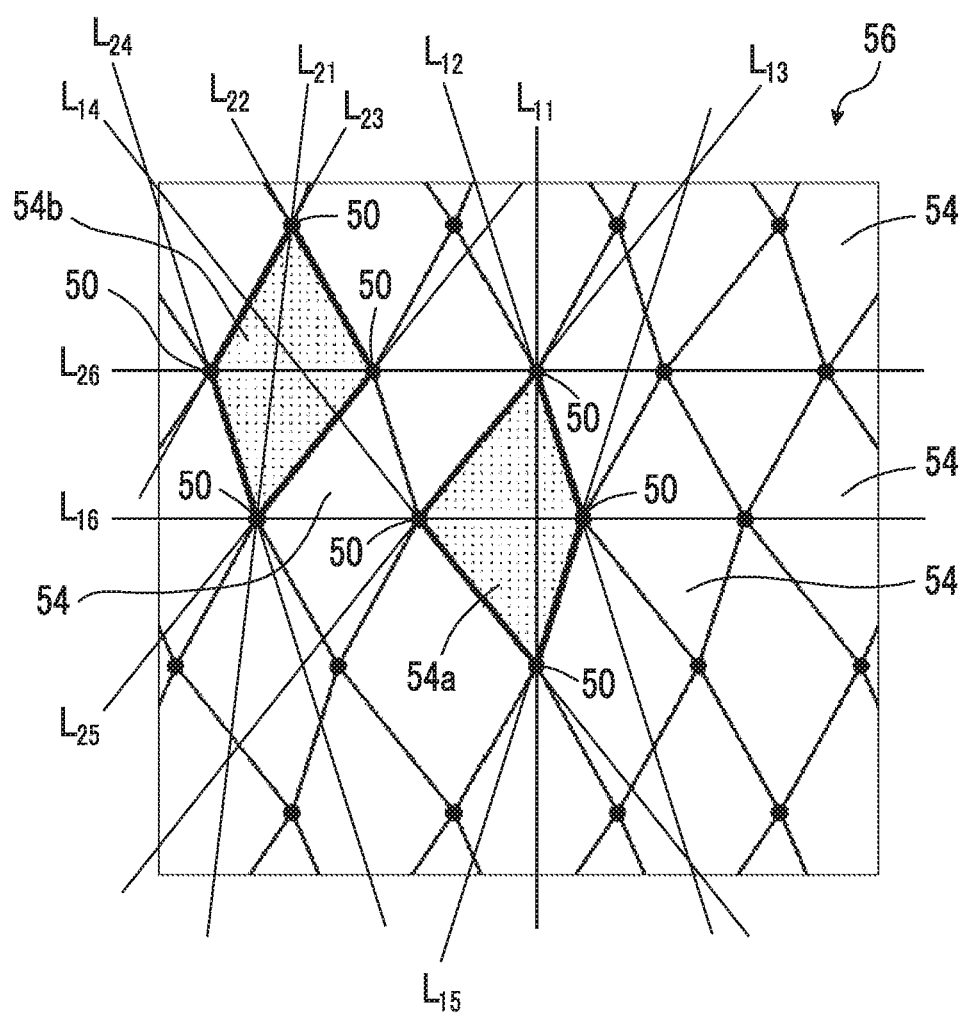
FIG. 11 is a schematic diagram showing an example of the method of obtaining the directional component in which vertices of the mesh cells of the conductive member for a touch panel according to the embodiment of the present invention are arranged in a straight line.
Figure 12:
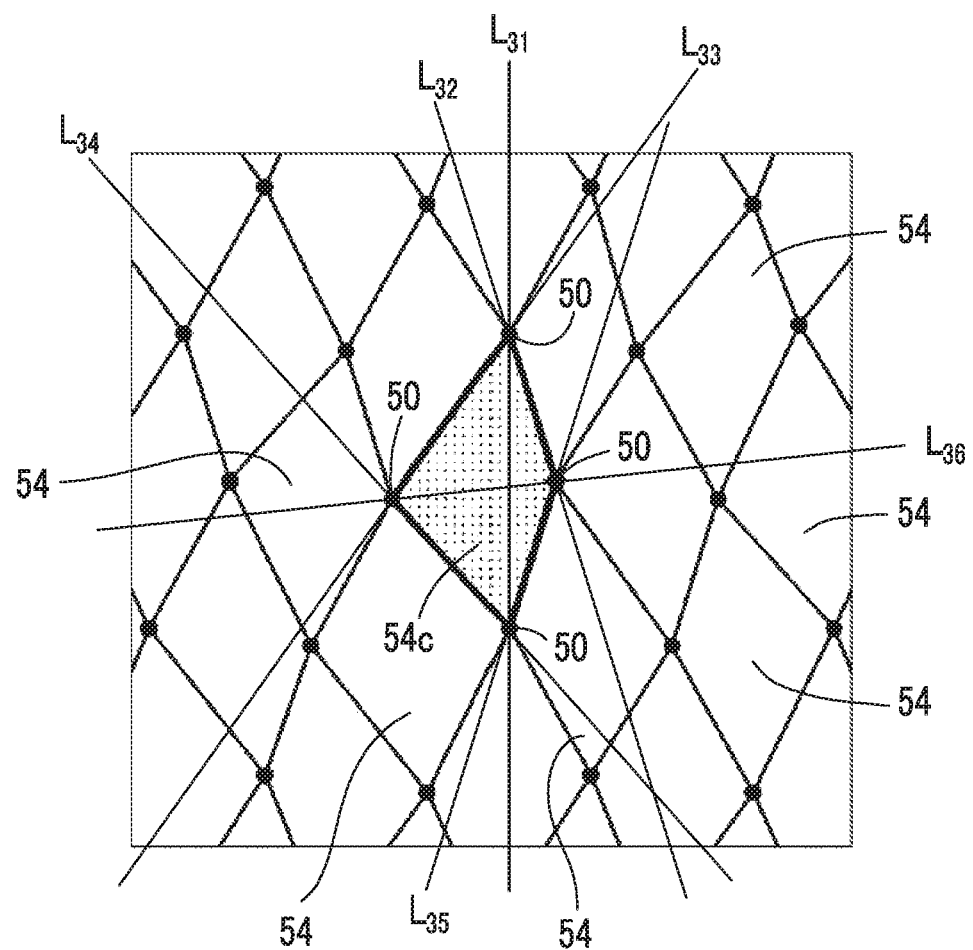
FIG. 12 is a schematic diagram showing another example of the method of obtaining the directional component in which vertices of the mesh cells of the conductive member for a touch panel according to the embodiment of the present invention are arranged in a straight line.

FIG. 10 is a flowchart showing a method of obtaining the number of directional component in which the vertices of the mesh cells of the conductive member for a touch panel according to the embodiment of the present invention are arranged in a straight line, FIG. 11 is a schematic diagram showing an example of the method of obtaining the directional component in which vertices of the mesh cells of the conductive member for a touch panel according to the embodiment of the present invention are arranged in a straight line, and FIG. 12 is a schematic diagram showing another example of the method of obtaining the directional component in which vertices of the mesh cells of the conductive member for a touch panel according to the embodiment of the present invention are arranged in a straight line.

FIG. 11 shows a first conductive layer 32, which has the same configuration as the above-described first conductive layer 32 shown in FIG. 4. FIG. 12 shows a first conductive layer 32, which has the same configuration as the above-described first conductive layer 32 shown in FIG. 5. The black circles shown in FIGS. 11 and 12 represent vertices 50 of first mesh cells 54.

For example, as for the first conductive layers 32 shown in FIGS. 11 and 12, for example, the first conductive layer 32 is imaged using an optical microscope, and an image is obtained. The image is taken into a personal computer to binarize the image, and thin metallic wires 52 are extracted. Next, a point at which at least two thin metallic wires 52 are in contact with each other is extracted as an intersection, and this intersection is defined as a vertex 50 of the first mesh cell 54. Coordinates are set at the respective vertices 50. Accordingly, the coordinates of the vertices 50 in the first conductive layers 32 shown in FIGS. 11 and 12 can be specified. The method of obtaining the directional component in which the vertices of the mesh cells are arranged in a straight line, which will be described later, is conducted using, for example, a personal computer and various software in the personal computer.

The directional component in which the vertices of the mesh cells are arranged in a straight line is indicated by the arrangement of the vertices. The directional component in which the vertices of the mesh cells are arranged in a straight line is obtained using, for example, the above-described image. Among the plurality of first mesh cells 54 shown in FIG. 11, for example, a first mesh cell 54a and a first mesh cell 54b will be described.

The coordinates of the vertices 50 of the first mesh cell 54a and the coordinates of the vertices 50 of the first mesh cell 54b are specified in advance.

As shown in FIG. 10, first, a line segment connecting the vertices in the mesh cell is obtained (Step S10). Specifically, a line segment passing through the vertices of the targeted mesh cell in the image is obtained. The line segment can be obtained as a line passing through two vertices.

As shown in FIG. 11, line segments $L_{11}$, $L_{12}$, $L_{13}$, $L_{14}$, $L_{15}$, and $L_{16}$ connecting the vertices 50 of the first mesh cell 54a are obtained. Line segments $L_{21}$, $L_{22}$, $L_{23}$, $L_{24}$, $L_{25}$, and $L_{26}$ connecting the vertices 50 are also obtained in the first mesh cell 54b.

Since the first mesh cell has a closed shape having a plurality of vertices, the number of line segments is represented by the sum of the number of sides and the number of diagonal lines. Accordingly, J=N+((number of vertices)×(number of vertices−3)÷2) is satisfied where J represents the number of line segments. N is the number of angles of the N-polygon, and represents the number of sides. N is 3 or greater. The number of line segments (not shown) of the second mesh cell is obtained in the same manner as in the method of counting the number of line segments of the first mesh cell.

Next, among the line segments $L_{11}$, $L_{12}$, $L_{13}$, $L_{14}$, $L_{15}$, and $L_{16}$ of the first mesh cell 54a and the line segments $L_{21}$, $L_{22}$, $L_{23}$, $L_{24}$, $L_{25}$, and $L_{26}$ of the first mesh cell 54b, a line segment passing through four or more mesh cells is detected (Step S12). Passing through four or more vertices of mesh cells is not limited as long as the line segment passes through four or more vertices of four or more continuous mesh cells in one direction. The four or more continuous mesh cells represent four or more adjacent mesh cells. The number of mesh cells through which the line segment to be detected passes may be at least four as described above, and the number of mesh cells through which the line segment passes is set in advance. The number of mesh cells through which the line segment passes is, for example, 4.

In the first mesh cell 54a shown in FIG. 11, the line segment $L_{16}$ is a line segment passing through four or more first mesh cells. In the first mesh cell 54b, the line segment $L_{26}$ is a line segment passing through four or more first mesh cells.

Regarding the expression that the line segment passes through four or more first mesh cells, in a case where a distance between the line segment and the vertex 50 is within a threshold value set in advance in which the line segment and the vertex 50 coincide with each other, the line segment is regarded to pass through the first mesh cells.

In a case where the line segments passing through four or more mesh cells are detected in Step S12, parallel line segments are found among the detected line segments (Step S14).

Regarding the term parallel, a change in distance between two target line segments along the length direction of the target line segment is obtained. A set value in which the line segments are parallel to each other is determined in advance with respect to the change in distance. In a case where the change in distance is within the set value, the two line segments are assumed to be parallel to each other.

Next, the number of sets of parallel line segments is obtained from the line segments. The number of sets of parallel line segments is the number of directional components in which the vertices of the mesh cells are arranged in a straight line (Step S16). In a case where there are two or more line segments which are parallel to each other, these two or more line segments are included in one set of parallel line segments. On the other hand, in a case where there is one line segment, the number of sets of parallel line segments is 0, that is, the number of directional components is 0. The direction of the parallel line segments is a direction of the directional component in which vertices of the mesh cells are arranged in a straight line. In this regard, in a case where there are two or more line segments which are parallel to each other and include line segments directing in opposite directions, for example, directing toward the right and the left directions, these two or more line segments are included in one set of parallel line segments, that is, the number of directional components is 1. In this manner, the number of directional components in which vertices of the mesh cells are arranged in a straight line and the direction thereof can be obtained. In a case where the number of sets of parallel line segments is 0, the number of directional components in which the vertices of the mesh cells are arranged in a straight line is 0.

In a case where there is no line segment passing through four or more first mesh cells in Step S12, the number of directional components in which the vertices of the mesh cells are arranged in a straight line is 0 (Step S20).

For example, in a first mesh cell 54c shown in FIG. 12, all line segments $L_{31}$, $L_{32}$, $L_{33}$, $L_{34}$, $L_{35}$, and $L_{36}$ passing through the vertices 50 do not pass through four or more first mesh cells. In a case where there is no line segment passing through four or more first mesh cells, the number of directional components in which the vertices of the mesh cells are arranged in a straight line is also 0 as described above.

Regarding the directional component in which the vertices of the mesh cells are arranged in a straight line, the line segments pass through four or more mesh cells, and the upper limit of the number of mesh cells through which the line segment passes is 10. Preferably, the line segment passes through the whole range of the first conductive layer 32. That is, it is preferable that the line segment crosses a plurality of first electrodes 34. In a case where a dummy electrode is provided adjacent to the first electrode 34, it is more preferable that the line segment passes through a plurality of first electrodes 34 and the dummy electrode.

The directional component in which the vertices of the mesh cells are arranged in a straight line has been described by using the first conductive layer 32 as an example. The directional component in which the vertices of the mesh cells are arranged in a straight line can also be obtained in the second conductive layer 40 in the same manner as in the case of the first conductive layer 32.

Hereinafter, the respective portions of the conductive member for a touch panel and the touch panel will be described.

<Thin Metallic Wire>

The thin metallic wires 52 constitute the first mesh cells 54 and the second mesh cells 64.

The line width of the thin metallic wire 52 is 30 μm or less, preferably 0.5 μm or greater and 10 μm or less, more preferably 1 μm or greater and 5 μm or less, and most preferably 1 μm or greater and 3 μm or less. In a case where the line width is within the above-described range, a low-resistance electrode having excellent visibility can be formed.

In a case where a thin metallic wire is applied as a peripheral wire, the line width of the thin metallic wire is preferably 10 μm or greater and 50 μm or less, more preferably 30 μm or less, and even more preferably 15 μm or less. In a case where the line width is within the above-described range, the area of the peripheral wiring portion of the touch panel can be reduced. That is, the frame can be narrowed.

The thickness of the thin metallic wire 52 is not particularly limited, and is preferably 10 μm or less, more preferably 1 μm or less, even more preferably 0.01 to 1 μm, and most preferably 0.05 to 0.8 μm. In a case where the thickness is within the above-described range, a low-resistance electrode having excellent durability can be formed.

In the measurement of the line width and the thickness of the thin metallic wire 52, first, a cross-sectional image of the thin metallic wire 52 is acquired using a scanning electron microscope. Next, the line width and the thickness of the thin metallic wire 52 are obtained from the cross-sectional image.

Examples of the first mesh cell 54 composed of the thin metallic wires 52 are those shown in FIGS. 4 to 8 described above. The closed shape of the first mesh cell 54 is as described above. The first mesh cell 54 is an N-polygon satisfying N≥3, and examples thereof include a triangle, a quadrangle, a pentagon, a hexagon, an octagon, and combinations thereof. The closed shape is not limited to shapes in which the vertices are connected by straight lines, such as the N-polygon. The vertices may be connected by curves, not straight lines.

The length of one side of the first mesh cell is preferably 50 µm or greater and 1,500 µm or less, more preferably 150 µm or greater and 800 µm or less, and even more preferably 200 µm or greater and 600 µm or less from the viewpoint of visibility.

The opening ratio of the mesh cells is preferably 90% or greater, and more preferably 95% or greater from the viewpoint of visible light transmittance. The opening ratio of the mesh cells corresponds to an unoccupied ratio of the thin metallic wires 52 in the region where the mesh cells are formed.

The pattern composed of the first mesh cells is not limited to fixed regular patterns, and may be an irregular pattern. In the irregular pattern, a plurality of mesh cells included in the pattern may be polygonal cells, particularly, quadrangle cells having an irregular side length of −10% to +10% of an average value of the side lengths of the cells.

In a case where the above-described irregular pattern is used for a touch panel, moire can be suppressed, color noise can be reduced, and visibility can be improved.

The second mesh cells may also have the same configuration as the first mesh cell.

Examples of the metal contained in the thin metallic wire 52 include metals such as gold (Au), silver (Ag), copper (Cu), and aluminum (Al) and alloys thereof. Among these, silver or copper is preferable since the thin metallic wire has excellent conductivity.

The thin metallic wire 52 may be formed of metallic particles and a binder.

Specifically, as the binder, at least one resin selected from the group consisting of gelatin, (meth)acrylic resins, styrene-based resins, vinyl-based resins, polyolefin-based resins, polyester-based resins, polyurethane-based resins, polyamide-based resins, polycarbonate-based resins, polydiene-based resins, epoxy-based resins, silicone-based resins, cellulose-based polymers, and chitosan-based polymers, or a copolymer formed of monomers constituting the above resin is used. As the metallic particles, particles of silver, copper, gold or the like are used.

The thin metallic wire is not limited to the above-described wire made of a metal or an alloy, and may contain, for example, metal oxide particles, a metal paste such as a silver paste and a copper paste, and metal nanowire particles such as silver nanowire and copper nanowire.

In addition, the thin metallic wire may have a single layer structure or a multilayer structure. The thin metallic wire may have, for example, a structure in which a copper oxynitride layer, a copper layer, and a copper oxynitride layer are laminated in order, a structure in which molybdenum (Mo), aluminum (Al), and molybdenum (Mo) are laminated in order, or a structure in which molybdenum (Mo), copper (Cu), and molybdenum (Mo) are laminated in order.

In order to reduce the reflectivity of the thin metallic wire, a blackening treatment may be performed to sulfurize or oxidize a surface of the thin metallic wire. Furthermore, a blackened layer may be provided to make the thin metallic wire hard to view. The blackened layer reduces, for example, the reflectivity of the thin metallic wire. The blackened layer can be made of copper nitride, copper oxide, copper oxynitride, molybdenum oxide, AgO, Pd, carbon, or other nitride or oxide. The blackened layer is disposed on the visual recognition side of the thin metallic wire, that is, on the touch face side.

<Manufacturing Method>

The manufacturing method of the thin metallic wires 52 of the first conductive layer 32 and the second conductive layer 40 is not particularly limited as long as the thin metallic wires can be formed on a transparent insulating substrate or the like. A plating method described in JP2014-159620A or JP2012-144761A, a silver salt method described in JP2012-006377A, JP2014-112512A, JP2014-209332A, JP2015-022397A, JP2016-192200A, or WO2016/157585A, a vapor deposition method described in JP2014-029614A, a printing method using a conductive ink described in JP2011-028985A, or the like can be properly used.

<First Peripheral Wiring Portion and Second Peripheral Wiring Portion>

The line widths (line) of the first peripheral wire 37 and the second peripheral wire 45 respectively formed in the first peripheral wiring portion 38 and the second peripheral wiring portion 46 are preferably 50 µm or less, more preferably 30 µm or less, and particularly preferably 15 µm or less. The interval (space) between the first peripheral wires 37 and the interval (space) between the second peripheral wires 45 are preferably 50 µm or less, more preferably 30 µm or less, and particularly preferably 15 µm or less. Since the areas of the first peripheral wiring portion 38 and the second peripheral wiring portion 46 can be reduced, it is preferable that the line width and the interval are within the above-described ranges, respectively.

The first peripheral wire 37 and the second peripheral wire 45 can also be formed by the above-described manufacturing method of the thin metallic wires 52. The first peripheral wire 37 and the conductive layer 32 can be simultaneously formed with the same material through the same process. The second peripheral wire 45 and the second conductive layer 40 can also be simultaneously formed with the same material through the same process.

<Transparent Insulating Substrate>

The transparent insulating substrate 30 supports the first conductive layer 32 and the second conductive layer 40. The kind of the transparent insulating substrate 30 is not particularly limited as long as it is possible to achieve the above-described support. Examples of the material of the transparent insulating substrate 30 include a transparent resin material and a transparent inorganic material.

Specific examples of the transparent resin material include acetyl cellulose-based resins such as triacetyl cellulose, polyester-based resins such as polyethylene terephthalate (PET) and polyethylene naphthalate (PEN), olefin-based resins such as polyethylene (PE), polymethylpentene, cycloolefin polymer (COP), and cycloolefin copolymer (COC), acryl-based resins such as polymethyl methacrylate, polyether sulfone, polycarbonate, polysulfone, polyether, polyether ketone, acrylonitrile, and methacrylonitrile. The thickness of the transparent resin material is preferably 20 to 200 µm.

Specific examples of the transparent inorganic material include glass such as alkali-free glass, alkali glass, chemically reinforced glass, soda glass, potash glass, and lead glass, ceramics such as translucent piezoelectric ceramics (lanthanum lead titanate zirconate (PLZT)), quartz, fluorite, and sapphire. The thickness of the transparent inorganic material is preferably 0.1 to 1.3 mm.

The total luminous transmittance of the transparent insulating substrate 30 is preferably 40% to 100%. The total luminous transmittance is measured using, for example, "Plastics—Determination of Total Luminous Transmittance and Reflectance" specified in JIS K 7375: 2008.

The transparent insulating substrate is not limited to independent members such as the above-described substrate, and may have a form called a layer or a film. Accordingly, the transparent insulating substrate may be a transparent insulating layer or a transparent insulating film formed by applying an acrylic resin.

As a preferable aspect of the transparent insulating substrate 30, there is provided a treated substrate subjected to at least one selected from the group consisting of an atmospheric pressure plasma treatment, a corona discharge treatment, and an ultraviolet irradiation treatment. By performing the above-described treatment, a hydrophilic group such as an OH group is introduced to the surface on which the first conductive layer 32 and the second conductive layer 40 are provided in the treated transparent insulating substrate 30, and adhesion to the first conductive layer 32 and the second conductive layer 40 is improved. Among the above-described treatments, an atmospheric pressure plasma treatment is preferable in that adhesion to the first conductive layer 32 and the second conductive layer 40 is further improved.

As another preferable aspect of the transparent insulating substrate 30, an underlayer containing a polymer is preferably provided on the surface on which the first conductive layer 32 and the second conductive layer 40 are provided. The adhesion between the first and second conductive layers 32 and 40 and the transparent insulating substrate 30 is further improved by forming the first and second conductive layers 32 and 40 on the underlayer.

The method of forming an underlayer is not particularly limited, and examples thereof include a method including: applying an underlayer forming composition containing a polymer to a substrate; and performing a heating treatment as necessary. The underlayer forming composition may contain a solvent as necessary. The kind of the solvent is not particularly limited. As the underlayer forming composition containing a polymer, gelatin, an acrylic resin, a urethane resin, or acrylic styrene-based latex containing inorganic or polymer fine particles may be used.

The thickness of the underlayer is not particularly limited. In view of more excellent adhesion between the first and second conductive layers 32 and 40 and the transparent insulating substrate 30, the thickness is preferably 0.02 to 2.0 μm, and more preferably 0.03 to 1.5 μm.

Other than the above-described underlayer, for example, an ultraviolet absorbing layer may be provided as necessary as another layer between the transparent insulating substrate 30 and the first and second conductive layers 32 and 40.

The following functional films may be further formed as necessary.

<Protective Layer>

A transparent protective layer may be formed on the thin metallic wires 52. An organic film such as gelatin, an acrylic resin, a urethane resin, or acrylic styrene-based latex, or an inorganic film such as silicon dioxide can be used as the protective layer, and the film thickness is preferably 10 nm to 10,000 nm.

A transparent coat layer may be formed on the protective layer as necessary. An organic film such as an acrylic resin or a urethane resin is used as the transparent coat layer. The transparent coat layer is formed in the sensing region 48, and the film thickness is 1 μm to 100 μm.

<Peripheral Wiring Insulating Film>

A peripheral wiring insulating film may be formed on the first peripheral wires 37 and the second peripheral wires 45 shown in FIG. 2 in order to prevent migration and corrosion of the peripheral wires. An organic film such as an acrylic resin or a urethane resin is used as the peripheral wiring insulating film, and the film thickness is preferably 1 μm to 30 μm. The peripheral wiring insulating film may be formed either on the first peripheral wires 37 or the second peripheral wires 45.

Basically, the invention is constituted as above. The conductive member for a touch panel and the touch panel according to the embodiment of the present invention have been described in detail, but the present invention is not limited to the above-described embodiments. Needless to say, various modifications or changes may be made without departing from the gist of the present invention.

EXAMPLES

Hereinafter, characteristics of the invention will be described in more detail with examples. The materials, reagents, amounts, substance amounts, ratios, treatment contents, treatment procedures, and the like shown in the following examples can be properly changed without departing from the intent of the invention. Accordingly, the scope of the invention is not restrictively interpreted by the following specific examples.

First Example

In First Example, conductive members for a touch panel of Examples 1 to 4 and Comparative Examples 1 and 2 were produced. The conductive members for a touch panel of Examples 1 to 4 and Comparative Examples 1 and 2 were evaluated in intersection visibleness, noise, and moire. The results thereof are shown in the following Table 1. Hereinafter, intersection visibleness, noise, and moire will be described.

<Intersection Visibleness>

A conductive member for a touch panel was observed under a fluorescent lamp from a side of a glass substrate having a molybdenum oxide layer (blackened layer) formed thereon, which will be described later, and 20 observers evaluated whether intersections of the mesh were visible in three stages: 1. "the intersections of the mesh are visible", 2. "the intersections of the mesh can be recognized in a case where he (or she) looks at the intersections closely", and 3. "the intersections of the mesh cannot be recognized".

"A": A very good level in which there was no observer judging that "the intersections of the mesh are visible" among the 20 observers, and there were 18 or more observers judging that "the intersections of the mesh cannot be recognized".

"B": A level with no problems in practical use in which there was no observer judging that "the intersections of the mesh are visible" among the 20 observers, and there were 17 or less observers judging that "the intersections of the mesh cannot be recognized".

"C": A level with problems in practical use in which there was one or more observers judging that "the intersections of the mesh are visible" among the 20 observers.

<Noise>

A conductive member for a touch panel was observed under a fluorescent lamp from a side of a glass substrate having a molybdenum oxide layer (blackened layer) formed thereon, which will be described later, and 20 observers evaluated noise (roughness) of the mesh cells in two stages: 1. "an uncomfortable feeling is generated from roughness" and 2. "roughness is negligible".

"A": A very good level in which there were 18 or more observers judging that "roughness is negligible" among the 20 observers.

"B": A level in which there were 12 to 17 observers judging that "roughness is negligible" among the 20 observers.

"C": A level with problems in practical use in which there were 11 or less observers judging that "roughness is negligible" among the 20 observers.

<Moire>

A conductive member for a touch panel was disposed on a display device (liquid crystal display (LCD)), and observed under a fluorescent lamp from a side of a glass substrate having a molybdenum oxide layer formed thereon, which will be described later, and 20 observers evaluated moire in two stages: 1. "moire is recognized" and 2. "moire cannot be recognized".

"A": A very good level in which there were 18 or more observers judging that "moire cannot be recognized" among the 20 observers.

"B": A level in which there were 12 to 17 observers judging that "moire cannot be recognized" among the 20 observers.

"C": A level with problems in practical use in which there were 11 or less observers judging that "moire cannot be recognized" among the 20 observers.

Hereinafter, the conductive member for a touch panel of First Example will be described.

A glass substrate having a thickness of 0.7 mm is prepared. A molybdenum oxide layer (blackened layer) having a thickness of 30 nm was formed on a first surface of the glass substrate using a sputtering method. Next, a lower molybdenum layer having a thickness of 30 nm was formed on the molybdenum oxide layer by using a sputtering method. Next, a copper layer having a thickness of 300 nm was formed on the lower molybdenum layer by using a sputtering method. An upper molybdenum layer having a thickness of 50 nm was formed on the copper layer by using a sputtering method, and a first conductive film formed of the molybdenum oxide layer, the lower molybdenum layer, the copper layer, and the upper molybdenum layer was formed.

A resist film was formed on the first conductive film by coating and subjected to pattern exposure via an exposure mask, and a resist pattern was formed by developing.

Next, using an etching solution (pH (hydrogen-ion exponent) 5.23) in which 10 mass % of ammonium dihydrogen phosphate, 10 mass % of ammonium acetate, 6 mass % of hydrogen peroxide, and the balance were prepared with water, the first conductive film formed of the molybdenum oxide layer, the molybdenum layer, the copper layer, and the molybdenum layer was etched, and the resist film was peeled off using a peeling solution. Therefore, a first conductive layer was formed. The mesh pattern of the first conductive layer was changed by changing the pattern of the exposure mask, and conductive members for a touch panel of Examples 1 to 4 and Comparative Examples 1 and 2 were produced.

The mesh pattern shown in FIG. 13 is composed of rhombus mesh cells having an acute angle of 60° and a side length of 350 μm.

The mesh patterns of FIGS. 4 to 7 and 11 are mesh patterns formed by moving the intersections of the meshes of FIG. 13 within a distance of 10% (35 μm) of the length of one side of the mesh cell. In all the conductive members for a touch panel of Examples 1 to 4 and Comparative Examples 1 and 2, the line width of the thin metallic wire was 3 μm.

Next, Examples 1 to 4 and Comparative Examples 1 and 2 will be described.

Example 1

In Example 1, the line width of the thin metallic wires was 3 μm. The mesh pattern was as shown in FIG. 4. In Example 1, the number of directional components in which the vertices of the mesh cells are arranged in a straight line is 1. The intersection thickening index (the area of an intersection portion of the mesh/the square of a line width of the thin metallic wires of the mesh) was 2.5.

The intersection thickening index (the area of an intersection portion of the mesh/the square of a line width of the thin metallic wires of the mesh) was measured as follows.

The intersection thickening index is an average value at 5 intersections of the mesh.

The line width of the thin metallic wires was measured at a midpoint (a midpoint of a side of a mesh cell) between the intersections of the mesh. The line width of the thin metallic wires is an average value of the line widths of the lines extending from the intersections of the mesh. Since the mesh pattern shown in FIG. 4 has a quadrangle mesh shape, an average value of the line widths of four thin metallic wires extending from the intersection is used. The intersection thickening indices of the following Examples 2 to 4 and Comparative Examples 1 and 2 were measured in the same manner as in Example 1.

Example 2

The configuration and the producing method of Example 2 are the same as those of Example 1, except that the mesh pattern is as shown in FIG. 5 and the number of directional components in which the vertices of the mesh cells are arranged in a straight line is 0. The intersection thickening index (the area of an intersection portion of the mesh/the square of a line width of the thin metallic wires of the mesh) was 2.5.

Example 3

The configuration and the producing method of Example 3 are the same as those of Example 1, except that the mesh pattern is as shown in FIG. 6. The intersection thickening index (the area of an intersection portion of the mesh/the square of a line width of the thin metallic wires of the mesh) was 2.5.

Example 4

The configuration and the producing method of Example 4 are the same as those of Example 1, except that the mesh pattern is as shown in FIG. 7 and the mesh cells have a triangle shape. The intersection thickening index (the area of an intersection portion of the mesh/the square of a line width of the thin metallic wires of the mesh) was 2.9.

Comparative Example 1

The configuration and the producing method of Comparative Example 1 are the same as those of Example 1, except that the mesh pattern is as shown in FIG. 13 and the number of directional components in which the vertices of the mesh cells are arranged in a straight line is 4. The intersection thickening index (the area of an intersection portion of the mesh/the square of a line width of the thin metallic wires of the mesh) was 2.4.

Comparative Example 2

The configuration and the producing method of Comparative Example 2 are the same as those of Example 1, except that the mesh pattern is as shown in FIG. 14 and the number of directional components in which the vertices of the mesh cells are arranged in a straight line is 2. The mesh pattern of FIG. 14 is a mesh pattern in which the thin metallic wires of the fixed rhombus mesh pattern of FIG. 13 are moved in parallel to deform the mesh pattern such that a side length of the mesh cells randomly varies within a range of 90% to 110% from a side length of the mesh cells of FIG. 13. The intersection thickening index (the area of an intersection portion of the mesh/the square of a line width of the thin metallic wires of the mesh) was 2.3.

TABLE 1

| | Mesh Pattern | Number of Directional Component | Shape of Mesh Cell | Intersection Visibleness | Noise | Moire |
|---|---|---|---|---|---|---|
| Example 1 | FIG. 4 | 1 | Quadrangle | A | A | A |
| Example 2 | FIG. 5 | 0 | Quadrangle | A | B | A |
| Example 3 | FIG. 6 | 1 | Quadrangle | A | A | A |
| Example 4 | FIG. 7 | 1 | Triangle | A | A | B |
| Comparative Example 1 | FIG. 13 | 4 | Quadrangle (rhombus) | C | A | A |
| Comparative Example 2 | FIG. 14 | 2 | Quadrangle | C | A | A |

As shown in Table 1, Examples 1 to 4 were more excellent than Comparative Examples 1 and 2 in evaluation of intersection visibleness.

In Examples 1 to 4, Examples in which the number of directional components in which the vertices of the mesh cells were arranged in a straight line was 1 were excellent in evaluation of noise. In addition, Examples in which the mesh cells had a quadrangle shape were excellent in evaluation of moire.

Second Example

In Second Example, touch panels of the following Examples 10 to 13 and Comparative Examples 10 and 11 were produced. The touch panels of Examples 10 to 13 and Comparative Examples 10 and 11 were evaluated in intersection visibleness, noise, moire, and touch sensitivity. The results thereof are shown in the following Table 2.

Intersection visibleness, noise, and moire are evaluated in the same manner as in First Example described above, except that instead of a conductive member for a touch panel, a touch panel is observed under a fluorescent lamp from a side of a glass substrate having a molybdenum oxide layer formed thereon. Accordingly, detailed description thereof will be omitted. Hereinafter, touch sensitivity will be described.

Hereinafter, the touch panel of Second Example will be described.

A glass substrate having a thickness of 0.7 mm is prepared. A molybdenum oxide layer (blackened layer) having a thickness of 30 nm was formed on a first surface of the glass substrate by using a sputtering method. Next, a lower molybdenum layer having a thickness of 30 nm was formed on the molybdenum oxide layer by using a sputtering method. Next, a copper layer having a thickness of 300 nm was formed on the lower molybdenum layer by using a sputtering method. An upper molybdenum layer having a thickness of 50 nm was formed on the copper layer by using a sputtering method, and a first conductive film formed of the molybdenum oxide layer, the lower molybdenum layer, the copper layer, and the upper molybdenum layer was formed.

A resist film was formed on the first conductive film by coating, subjected to pattern exposure via an exposure mask, and developed, and thus a resist pattern was formed.

Next, using an etching solution (pH (hydrogen-ion exponent) 5.23) in which 10 mass % of ammonium dihydrogen phosphate, 10 mass % of ammonium acetate, 6 mass % of hydrogen peroxide, and the balance were prepared with water, the first conductive film formed of the molybdenum oxide layer, the molybdenum layer, the copper layer, and the molybdenum layer was etched, and the resist film was peeled off using a peeling solution. Therefore, a first conductive layer was formed.

Next, an interlayer insulating film formed of an acrylic resin and having a thickness of 10 μm was formed on the first conductive layer. A second conductive film formed of a molybdenum oxide layer, a lower molybdenum layer, a copper layer, and an upper molybdenum layer was formed on the interlayer insulating film by using a sputtering method in the same manner as in the case of the first conductive film. In addition, a second conductive layer was formed by performing resist coating, pattern exposure, development, etching, and resist peeling in the same manner as in the case of the first conductive film. A protective layer formed of an acrylic resin was formed on the second conductive layer, and a touch panel was formed. The touch panel has a configuration in which the second conductive layer is disposed on the uppermost layer on the molybdenum oxide side of the glass substrate. The mesh patterns of the first conductive layer and the second conductive layer were changed by changing the pattern of the exposure mask, and touch panels of Examples 10 to 13 and Comparative Examples 10 and 11 were formed. In the touch panels of Examples 10 to 13 and Comparative Examples 10 and 11, the line width of all the thin metallic wires was 3 μm.

<Touch Sensitivity>

Touch sensitivity was evaluated as follows.

Using a probe robot, a stylus pen having a tip end diameter of 2 mm was brought into contact with 10,000 positions previously set on a surface of the touch panel in order, and each touch position was detected. Results of the detection of the 10,000 positions and set values corresponding thereto were compared. Using a 9973-th value from a minimum absolute value of a differential vector between the detected position and the set position, sensitivity was evaluated based on the following evaluation standards.

"A": The above-described 9973-th value is less than 1.0 mm.

"B": The above-described 9973-th value is equal to or greater than 1.0 mm and less than 2.0 mm.

"C": The above-described 9973-th value is equal to or greater than 2.0 mm.

Hereinafter, the touch panels of Examples 10 to 13 and Comparative Examples 10 and 11 will be described.

Example 10

In Example 10, the first mesh pattern of the first conductive layer was as shown in FIG. 4, and the second mesh pattern of the second conductive layer was as shown in FIG. 6. The first conductive layer and the second conductive layer overlapped such that the vertex of the first mesh cell was disposed in the second mesh cell as shown in FIG. 9. In Example 10, in the first conductive layer, the number of directional components in which the vertices of the mesh cells are arranged in a straight line is 1, and in the second conductive layer, the number of directional components in which the vertices of the mesh cells are arranged in a straight line is 1. The directional components in which the vertices of the mesh cells are arranged in a straight line are orthogonal to each other. Each of the intersection thickening indices of the first conductive layer and the second conductive layer was 2.5. The intersection thickening index was measured in the same manner as in Example 1 of First Example described above. The intersection thickening indices of the following Examples 11 to 13 and Comparative Examples 10 and 11 were also measured in the same manner as in Example 1 of First Example described above.

Example 11

The configuration and the producing method of Example 11 are the same as those of Example 10, except that the first mesh pattern of the first conductive layer is as shown in FIG. 5 and the second mesh pattern of the second conductive layer is as shown in FIG. 5. In Example 11, the number of directional components in which the vertices of the mesh cells are arranged in a straight line is 0. In Example 11, the first conductive layer and the second conductive layer were a combination of the same mesh patterns. Each of the intersection thickening indices of the first conductive layer and the second conductive layer was 2.5.

Example 12

The configuration and the producing method of Example 12 are the same as those of Example 10, except that the first mesh pattern of the first conductive layer is as shown in FIG. 4 and the second mesh pattern of the second conductive layer is as shown in FIG. 4. In Example 12, the first conductive layer and the second conductive layer were a combination of the same mesh patterns. In Example 12, the directional components in which the vertices of the mesh cells are arranged in a straight line do not intersect. Each of the intersection thickening indices of the first conductive layer and the second conductive layer was 2.5.

Example 13

The configuration and the producing method of Example 13 are the same as those of Example 10, except that the first mesh pattern of the first conductive layer is as shown in FIG. 7 and the second mesh pattern of the second conductive layer is as shown in FIG. 8. In Example 13, the mesh cells of the first conductive layer and the second conductive layer have a triangle shape, and in both the first conductive layer and the second conductive layer, the number of directional components in which the vertices of the mesh cells are arranged in a straight line is 1. The directional components in which the vertices of the mesh cells are arranged in a straight line are orthogonal to each other.

The mesh pattern of FIG. 8 is a mesh pattern formed by moving the intersections of the meshes of FIG. 13 within a distance of 10% (35 μm) of the length of one side of the mesh cell. The line width of the thin metallic wires was 3 μm. Each of the intersection thickening indices of the first conductive layer and the second conductive layer was 2.9.

Comparative Example 10

The configuration and the producing method of Comparative Example 10 are the same as those of Example 10, except that the first mesh pattern of the first conductive layer is as shown in FIG. 13 and the second mesh pattern of the second conductive layer is as shown in FIG. 13. In Comparative Example 10, the mesh cells of the first conductive layer and the second conductive layer have a rhombus shape, and in both the first conductive layer and the second conductive layer, the number of directional components in which the vertices of the mesh cells are arranged in a straight line is 4. Each of the intersection thickening indices of the first conductive layer and the second conductive layer was 2.4.

Comparative Example 11

The configuration and the producing method of Comparative Example 11 are the same as those of Example 10, except that the first mesh pattern of the first conductive layer is as shown in FIG. 14 and the second mesh pattern of the second conductive layer is as shown in FIG. 14. In Comparative Example 11, in both the first conductive layer and the second conductive layer, the number of directional components in which the vertices of the mesh cells are arranged in a straight line is 2. Each of the intersection thickening indices of the first conductive layer and the second conductive layer was 2.3.

TABLE 2

|  | First Mesh Pattern of First Conductive Layer | Number of Directional Component of First Conductive Layer | Shape of First Mesh Cell | Second Mesh Pattern of Second Conductive Layer | Number of Directional Component of Second Conductive Layer | Shape of Second Mesh Cell | Intersection Visibleness | Noise | Moire | Touch Sensitivity |
|---|---|---|---|---|---|---|---|---|---|---|
| Example 10 | FIG. 4 | 1 | Quadrangle | FIG. 6 | 1 | Quadrangle | A | A | A | A |
| Example 11 | FIG. 5 | 0 | Quadrangle | FIG. 5 | 0 | Quadrangle | A | B | A | B |
| Example 12 | FIG. 4 | 1 | Quadrangle | FIG. 4 | 1 | Quadrangle | B | A | A | A |
| Example 13 | FIG. 7 | 1 | Triangle | FIG. 8 | 1 | Triangle | A | B | B | B |
| Comparative Example 10 | FIG. 13 | 4 | Quadrangle (rhombus) | FIG. 13 | 4 | Quadrangle (rhombus) | C | A | A | A |
| Comparative Example 11 | FIG. 14 | 2 | Quadrangle | FIG. 14 | 2 | Quadrangle | C | A | A | A |

As shown in Table 2. Examples 10 to 13 were more excellent than Comparative Examples 10 and 11 in evaluation of intersection visibleness.

In Examples 10 to 13, in a case where the mesh cells had the same shape, Examples in which the number of directional components in which the vertices of the mesh cells were arranged in a straight line was 1 were excellent in evaluation of noise and touch sensitivity. In addition, Examples in which the mesh cells had a quadrangle shape were excellent in evaluation of noise, moire, and touch sensitivity.

In Example 12, in both the first conductive layer and the second conductive layer, the number of directional components in which the vertices of the mesh cells were arranged in a straight line was 1, but the directional component of the first conductive layer in which the vertices of the mesh cells were arranged in a straight line and the directional component of the second conductive layer in which the vertices of the mesh cells were arranged in a straight line did not intersect. However, in Example 10, the directional component of the first conductive layer in which the vertices of the mesh cells were arranged in a straight line and the directional component of the second conductive layer in which the vertices of the mesh cells were arranged in a straight line intersected at a right angle. Accordingly, Example 10 was excellent in evaluation of intersection visibleness.

EXPLANATION OF REFERENCES

10: touch panel
11: conductive member for touch panel
12: cover layer
12a: front surface
14: controller
15, 18: transparent layer
20: display panel
30: transparent insulating substrate
30a: front surface
30b: rear surface
30c: one side
31: insulating film
32: first conductive layer
34: first electrode
34a, 42a: interelectrode space
36: first pad
37: first peripheral wire
38: first peripheral wiring portion
39: terminal connection region
40: second conductive layer
42: second electrode
44: second pad
45: second peripheral wire
46: second peripheral wiring portion
47: terminal connection region
48: sensing region
48a: intersection portion
49: transparent layer
50, 60, 104: vertex
52: thin metallic wire
54, 54a. 54b, 54c: first mesh cell
56: first mesh pattern
64: second mesh cell
66: second mesh pattern
100, 100a: mesh pattern
102, 106: mesh cell
D1: first direction
D2: second direction
Dn: direction
G1, G2, G3, G4, G5, G6: direction of directional component in which vertices of mesh cells are arranged in straight line
H1: extending direction
H2: direction
$L_{11}, L_{12}, L_{13}, L_{14}, L_{15}, L_{16}$: line segment
$L_{21}, L_{22}, L_{23}, L_{24}, L_{25}, L_{26}$: line segment
$L_{31}, L_{32}, L_{33}, L_{34}, L_{35}, L_{36}$: line segment
S10, S12, S14, S16, S20: step

What is claimed is:

1. A conductive member for a touch panel comprising:
a transparent insulating substrate; and
a first conductive layer which is formed on the transparent insulating substrate,
wherein the first conductive layer has a first mesh pattern which is composed of a plurality of first mesh cells having a closed shape and formed of thin metal wires,
wherein the first mesh cells adjacent to each other are asymmetrical,
wherein the number of directional components in which vertices of the plurality of first mesh cells are arranged in a straight line is 1, and
wherein the number of directional components in which vertices of the plurality of first mesh cells are arranged in a straight line represents the number of sets of parallel line segments, each of the line segments passing through four or more vertices of four or more of the plurality of first mesh cells which are continuously arranged in a straight line, and each of the sets of parallel line segments includes a plurality of the parallel line segments.

2. The conductive member for a touch panel according to claim 1,
wherein the closed shape of the first mesh pattern is an N-polygon, and N is 3 or greater.

3. The conductive member for a touch panel according to claim 2,
wherein the N-polygon is a quadrangle.

4. The conductive member for a touch panel according to claim 1, further comprising:
a second conductive layer which is electrically insulated from the first conductive layer and spaced apart from the first conductive layer,
wherein the second conductive layer has a second mesh pattern which is composed of a plurality of second mesh cells having a closed shape and formed of thin metal wires,
wherein the second mesh cells adjacent to each other are asymmetrical,
wherein the number of directional components in which vertices of the plurality of second mesh cells are arranged in a straight line is 1 or less, and
wherein the number of directional components in which vertices of the plurality of second mesh cells are arranged in a straight line represents the number of sets of parallel line segments, each of the line segments passing through four or more vertices of four or more of the plurality of second mesh cells which are continuously arranged in a straight line.

5. The conductive member for a touch panel according to claim 1, further comprising:
a second conductive layer which is electrically insulated from the first conductive layer and spaced apart from the first conductive layer,
wherein the second conductive layer has a second mesh pattern which is composed of a plurality of second mesh cells having a closed shape and formed of thin metal wires,
wherein the second mesh cells adjacent to each other are asymmetrical,
wherein the number of directional components in which vertices of the plurality of second mesh cells are arranged in a straight line is 1 or less,
wherein the number of directional components in which vertices of the plurality of second mesh cells are arranged in a straight line represents the number of sets of parallel line segments, each of the line segments passing through four or more vertices of four or more of the plurality of second mesh cells which are continuously arranged in a straight line, and
wherein the vertices of the plurality of second mesh cells are disposed in the corresponding first mesh cells, respectively in a case where the vertices are viewed from a lamination direction of the first conductive layer and the second conductive layer overlapping each other.

6. The conductive member for a touch panel according to claim 5,
wherein the number of directional components in which vertices of the plurality of first mesh cells are arranged in a straight line and the number of directional components in which vertices of the plurality of second mesh cells are arranged in a straight line are all 1, and the directional component in which vertices of the plurality of first mesh cells are arranged in a straight line and the directional component in which vertices of the plurality of second mesh cells are arranged in a straight line intersect.

7. The conductive member for a touch panel according to claim 5,
wherein the closed shape of the second mesh pattern is an S-polygon, and S is 3 or greater.

8. The conductive member for a touch panel according to claim 7,
wherein the S-polygon is a quadrangle.

9. A touch panel comprising:
the conductive member for a touch panel according to claim 1.

* * * * *